(12) United States Patent
Alexander et al.

(10) Patent No.: US 7,162,761 B2
(45) Date of Patent: Jan. 16, 2007

(54) VERTICALLY-STORING DOCK LEVELER APPARATUS AND METHOD

(75) Inventors: James C. Alexander, Coppell, TX (US); Richard Hoofard, Dallas, TX (US)

(73) Assignee: 4Front Engineered Solutions, Inc., Carrollton, TX (US)

(*) Notice: Subject to any disclaimer, the term of this patent is extended or adjusted under 35 U.S.C. 154(b) by 0 days.

(21) Appl. No.: 10/854,294

(22) Filed: May 27, 2004

(65) Prior Publication Data

US 2005/0015900 A1   Jan. 27, 2005

Related U.S. Application Data

(63) Continuation-in-part of application No. 10/664,971, filed on Sep. 22, 2003, now Pat. No. 7,017,220, which is a continuation-in-part of application No. 10/444,971, filed on May 27, 2003, now Pat. No. 6,951,041.

(51) Int. Cl.
*E01D 1/00* (2006.01)

(52) U.S. Cl. ........................................ 14/71.3; 14/71.1

(58) Field of Classification Search ................ 14/69.5, 14/71.1, 71.3
See application file for complete search history.

(56) References Cited

U.S. PATENT DOCUMENTS

| | | | |
|---|---|---|---|
| 2,592,919 A | 4/1952 | Loomis et al. ................ | 14/71 |
| 3,122,764 A | 3/1964 | Ambi ............................ | 14/71 |
| 3,334,368 A | 8/1967 | McIntoch et al. ............. | 14/71 |
| 3,368,229 A | 2/1968 | Pfleger ......................... | 14/71 |
| 3,411,168 A | 11/1968 | Hecker, Jr. ................... | 14/71 |
| 3,440,673 A | 4/1969 | Kelley ......................... | 14/71 |
| 3,460,175 A * | 8/1969 | Beckwith et al. ............ | 14/71.3 |
| 3,475,778 A | 11/1969 | Merrick et al. .............. | 14/71 |
| 3,636,578 A * | 1/1972 | Dieter .......................... | 14/71.3 |
| 3,639,935 A | 2/1972 | Kumpolt ...................... | 14/72 |
| 3,699,601 A * | 10/1972 | Hecker et al. ............... | 14/71.3 |
| 3,766,585 A | 10/1973 | Yoon ............................ | 14/72 |
| 4,068,338 A | 1/1978 | Artzberger ................... | 14/71.3 |
| 4,665,579 A | 5/1987 | Bennett et al. .............. | 14/71.1 |
| 4,689,846 A | 9/1987 | Sherrod ....................... | 14/71.3 |
| 4,703,534 A * | 11/1987 | Pedersen ..................... | 14/71.1 |
| 4,776,052 A | 10/1988 | Delgado et al. ............. | 14/71.3 |
| 4,825,493 A | 5/1989 | Nguyen ....................... | 14/71.3 |
| 4,928,340 A | 5/1990 | Alexander ................... | 14/71.3 |
| 5,001,799 A | 3/1991 | Alexander ................... | 14/71.1 |
| 5,117,526 A | 6/1992 | Alexander ................... | 14/71.7 |
| 5,313,681 A | 5/1994 | Alexander ................... | 14/71.1 |
| 5,396,676 A | 3/1995 | Alexander et al. .......... | 14/71.1 |
| 5,416,941 A * | 5/1995 | Hageman .................... | 14/71.7 |
| 5,586,355 A | 12/1996 | Metz et al. .................. | 14/69.5 |
| 6,205,606 B1 | 3/2001 | Zibella et al. ............... | 14/71.3 |

OTHER PUBLICATIONS

Mrs. Baird's Bread Plant Photographs.
Serco Brochure regarding R&M Series, pp. 1-3.
Serco Brochure regarding "E" Series, pp. 1-2.
Serco Brochure regarding later "E" Series, pp. 1-2.

* cited by examiner

*Primary Examiner*—Gary S. Hartmann
(74) *Attorney, Agent, or Firm*—Baker & Hostetler LLP

(57) ABSTRACT

A dock leveler for bridging the gap between a loading dock and the bed of a vehicle parked at the loading dock. The dock leveler is configured for installation on the top of the dock and is designed to rotate from a vertically-stored raised position to at least one lowered, operative position. In some embodiments, the dock leveler can be lowered either for normal operation so that the deck assembly rests on the bed of the vehicle or it can be lowered to accommodate an end-loading condition.

7 Claims, 24 Drawing Sheets

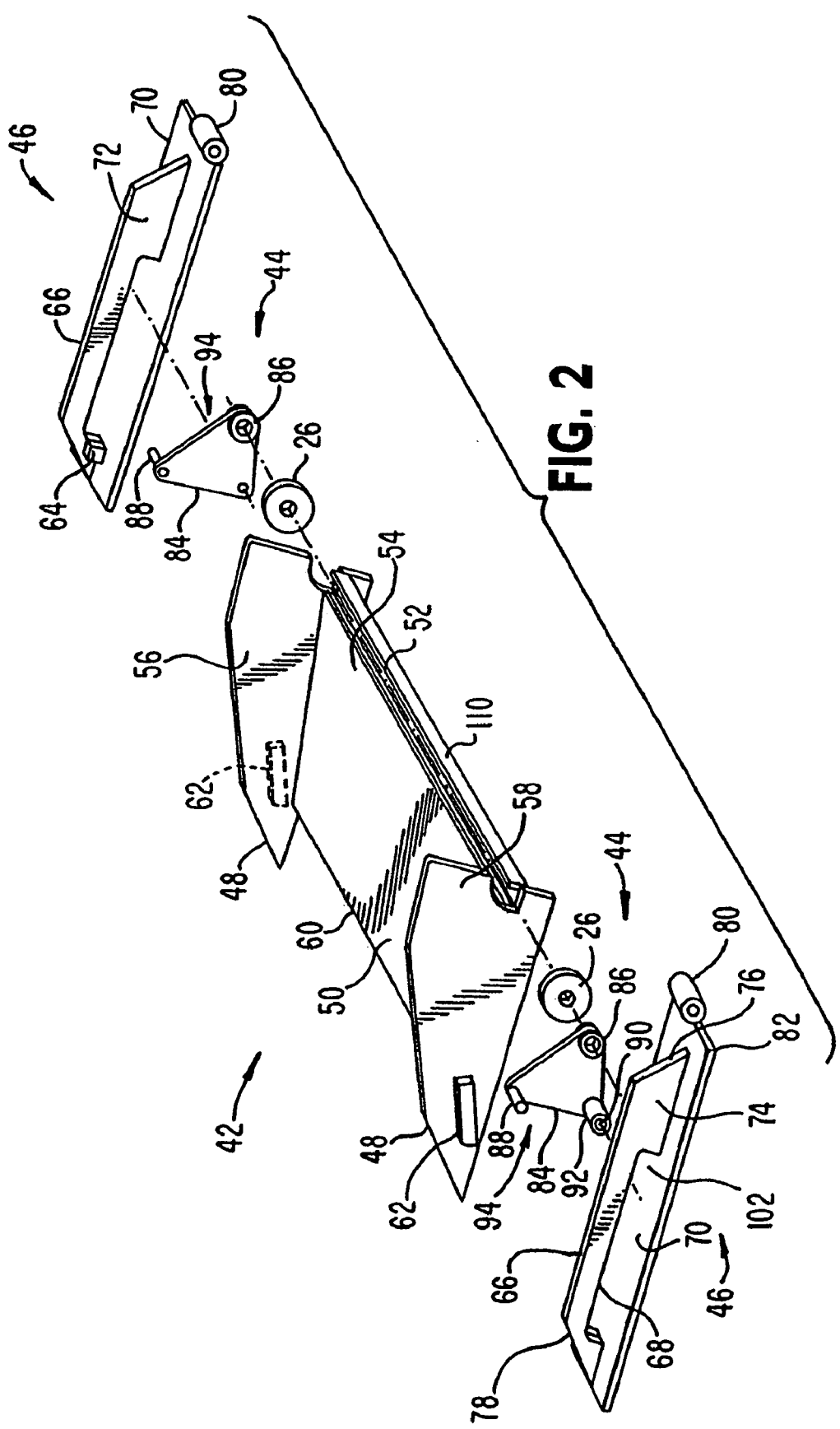

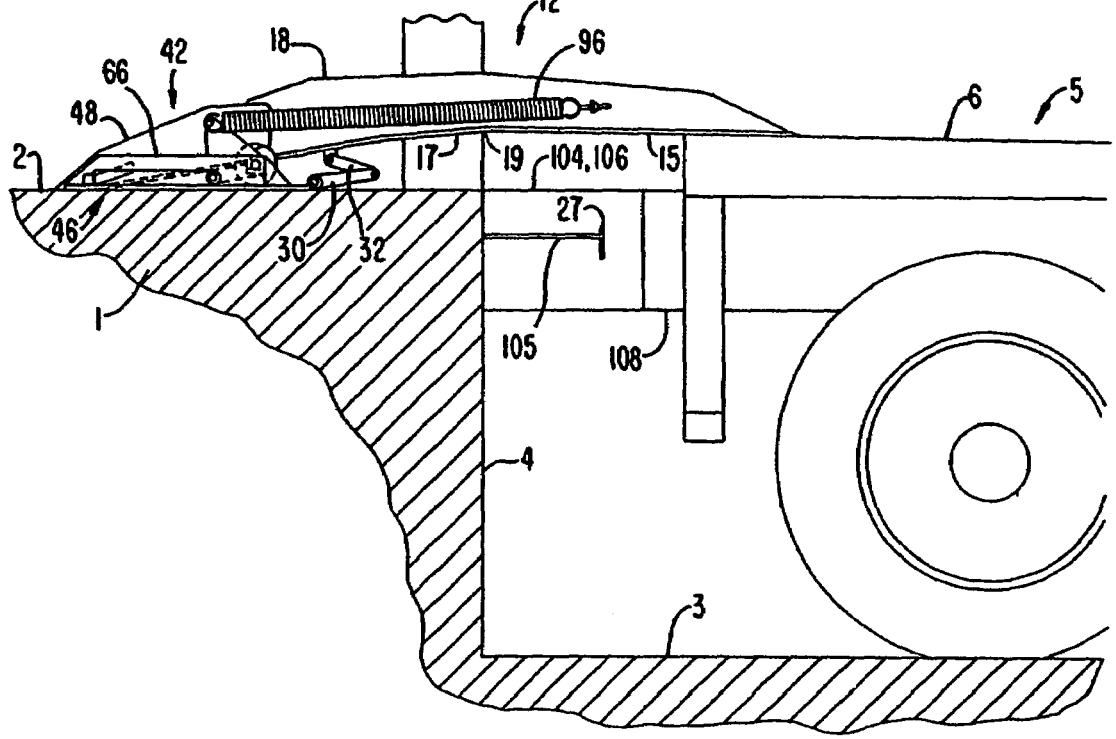
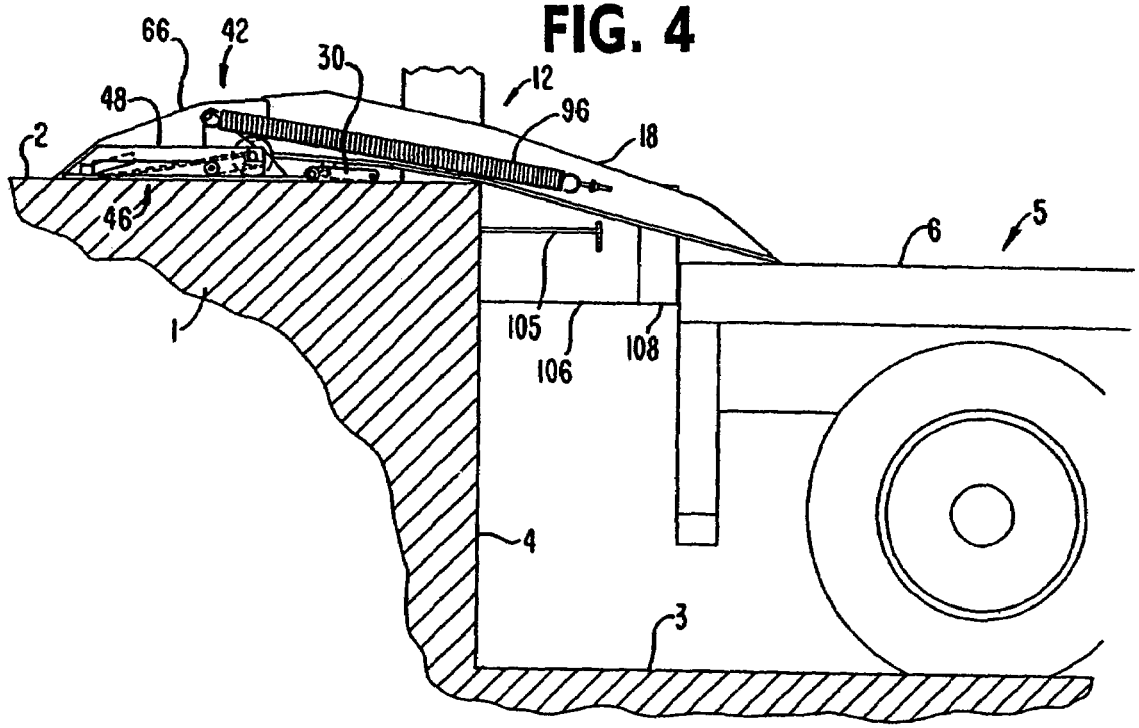

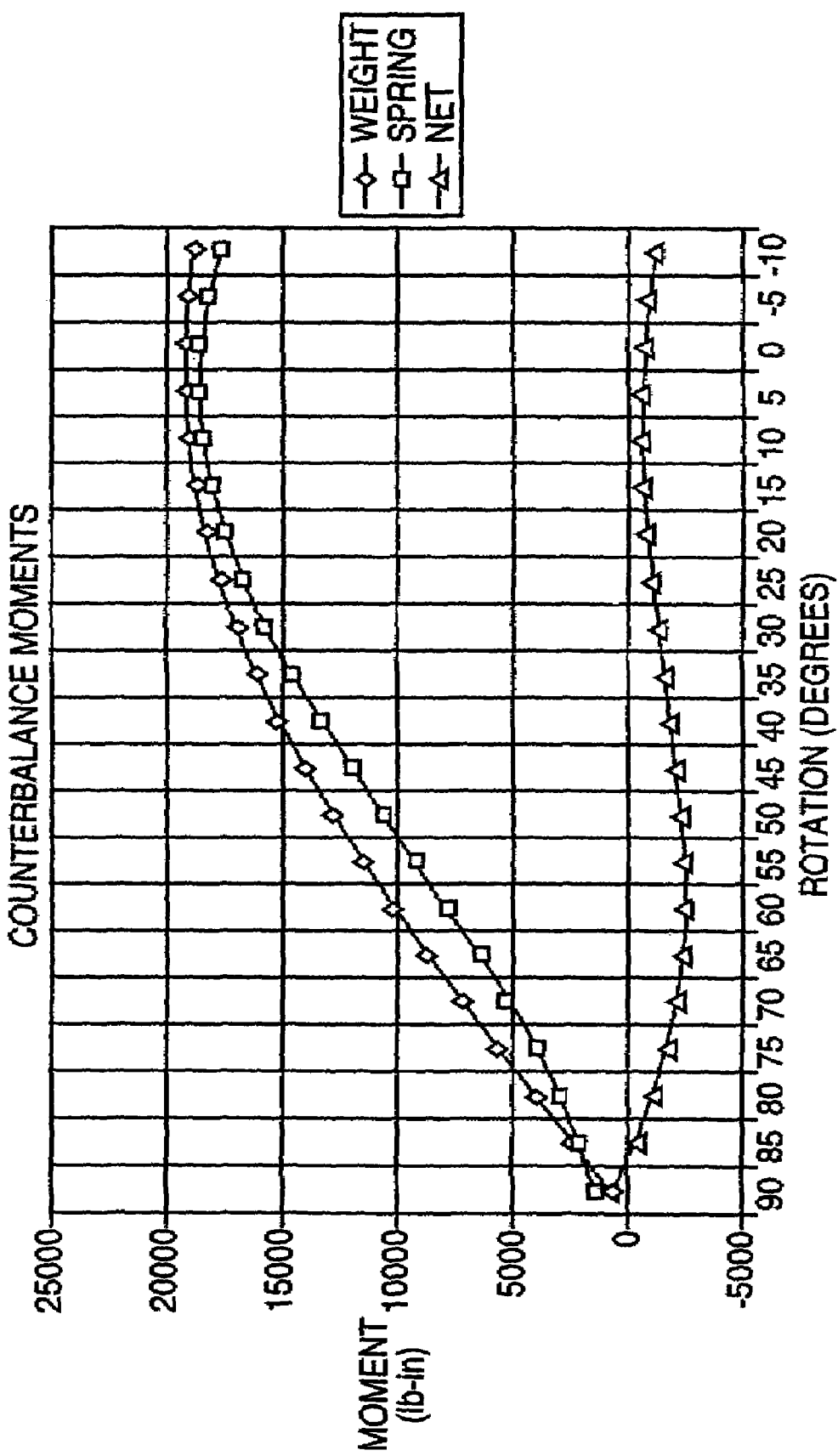

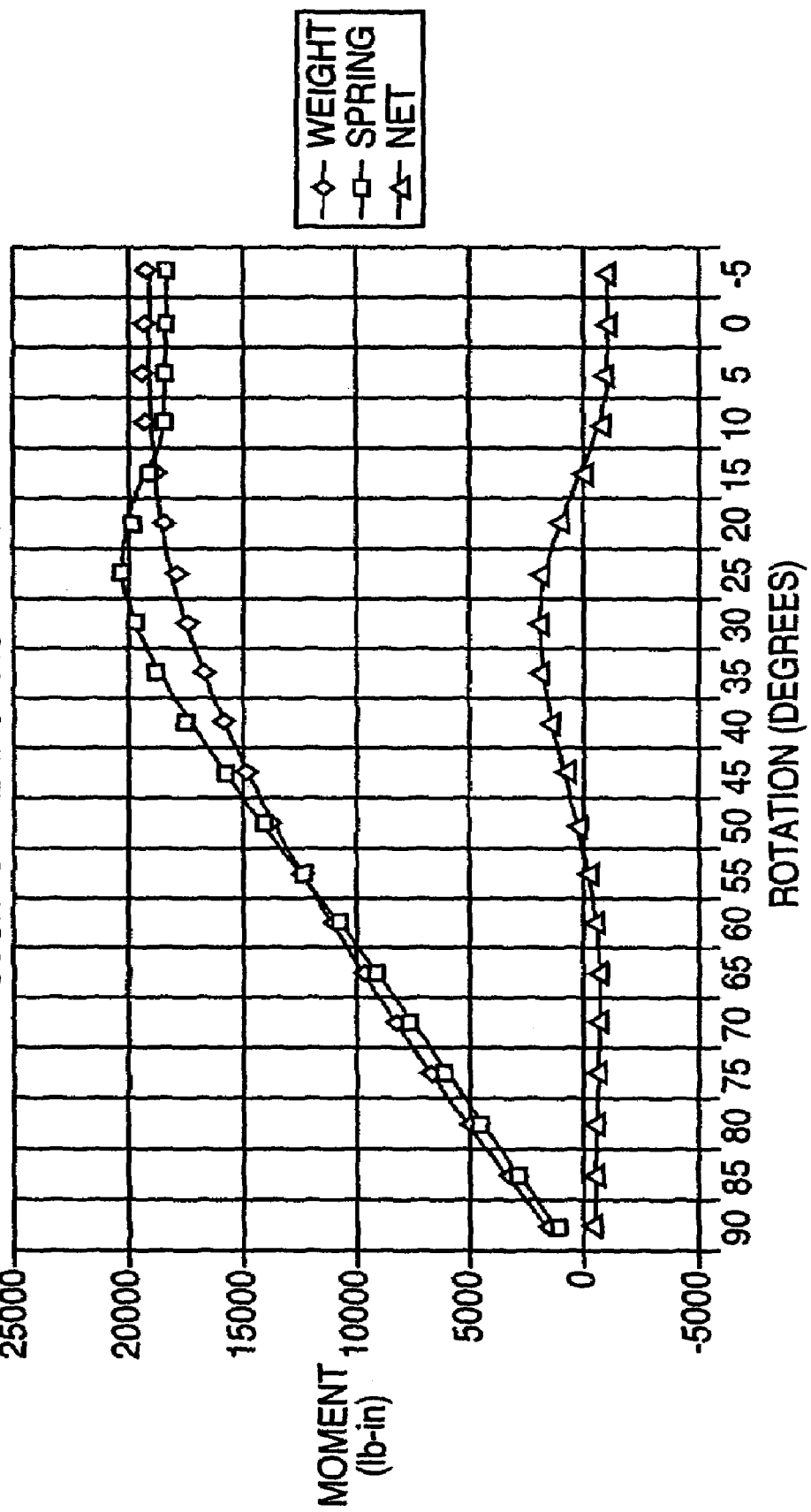

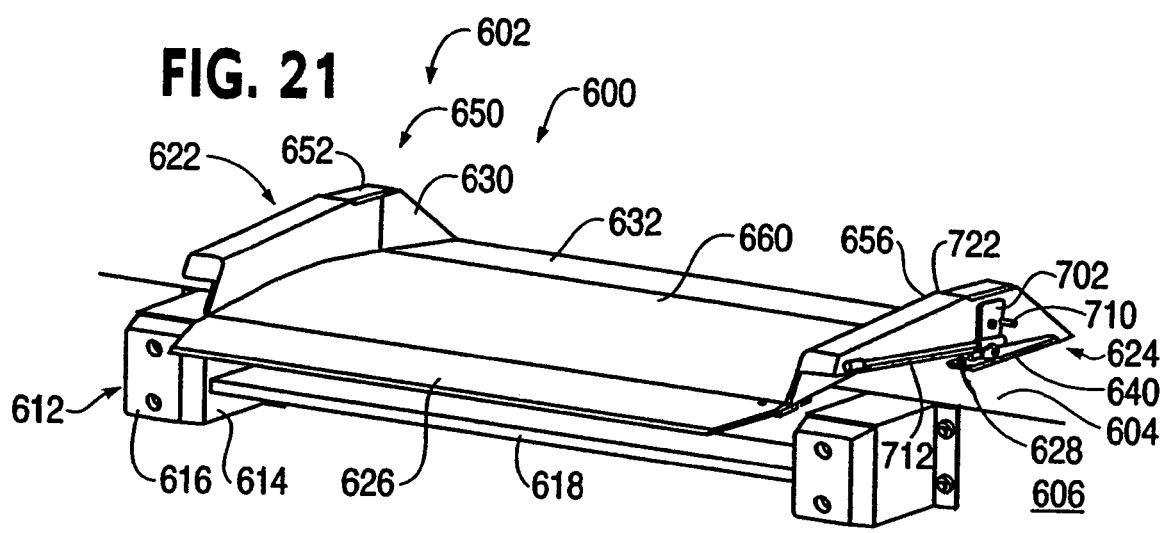
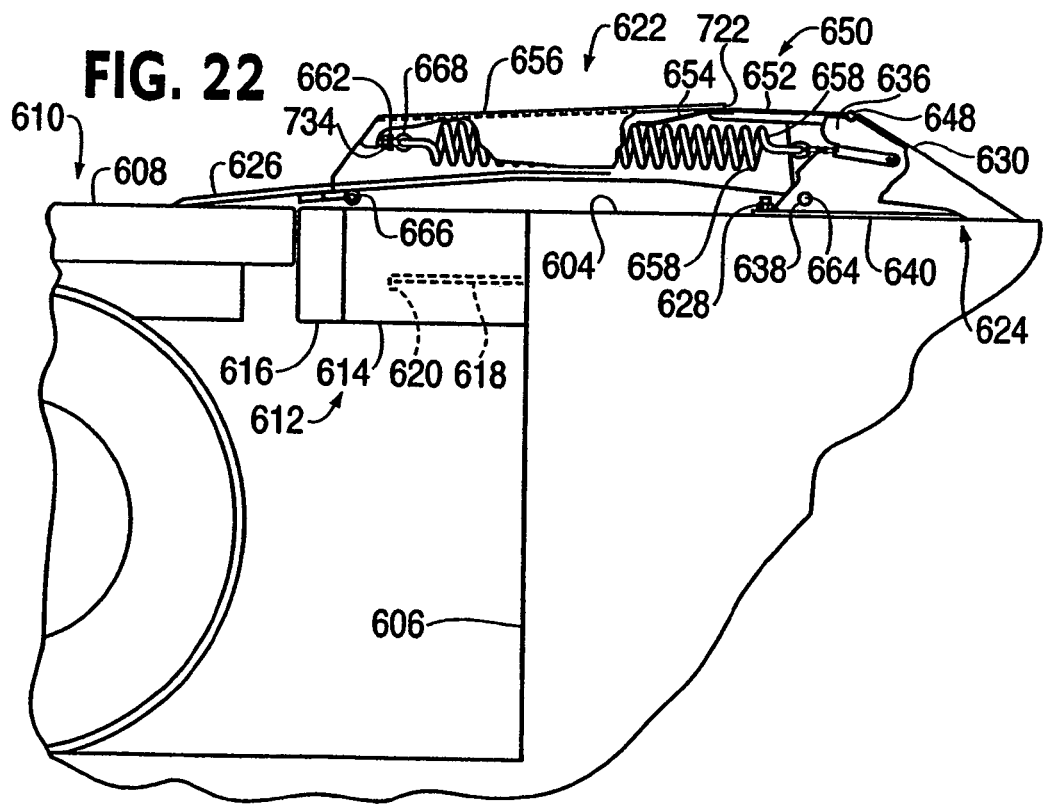

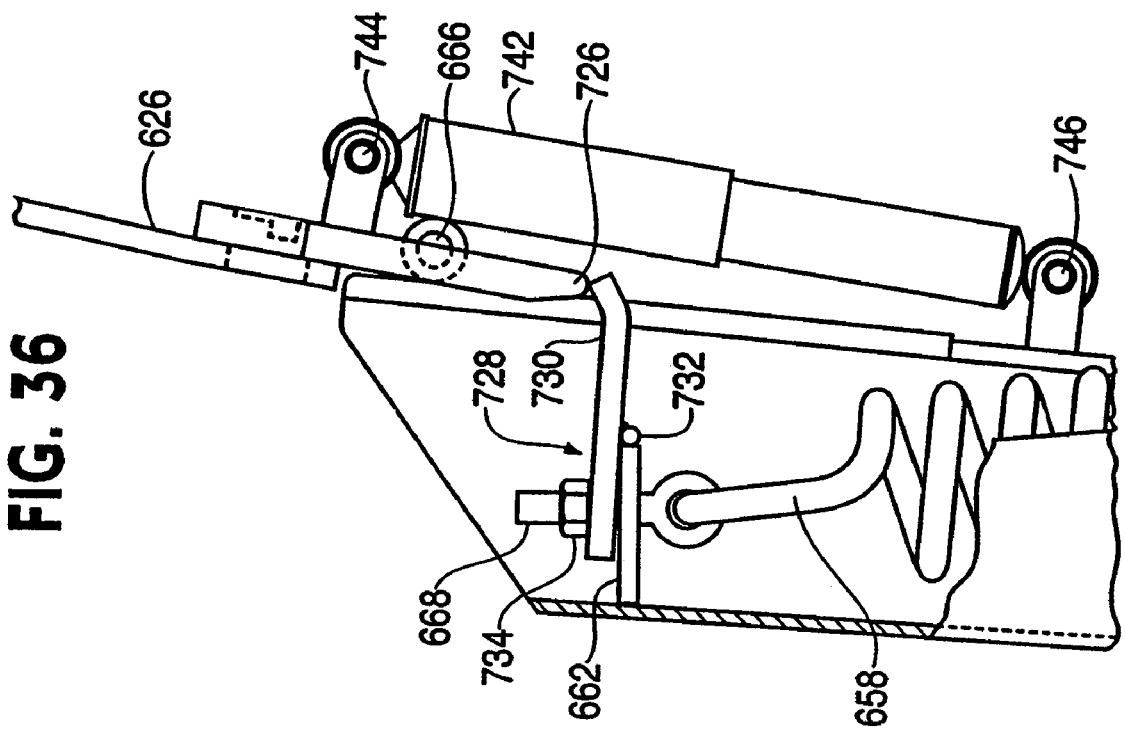
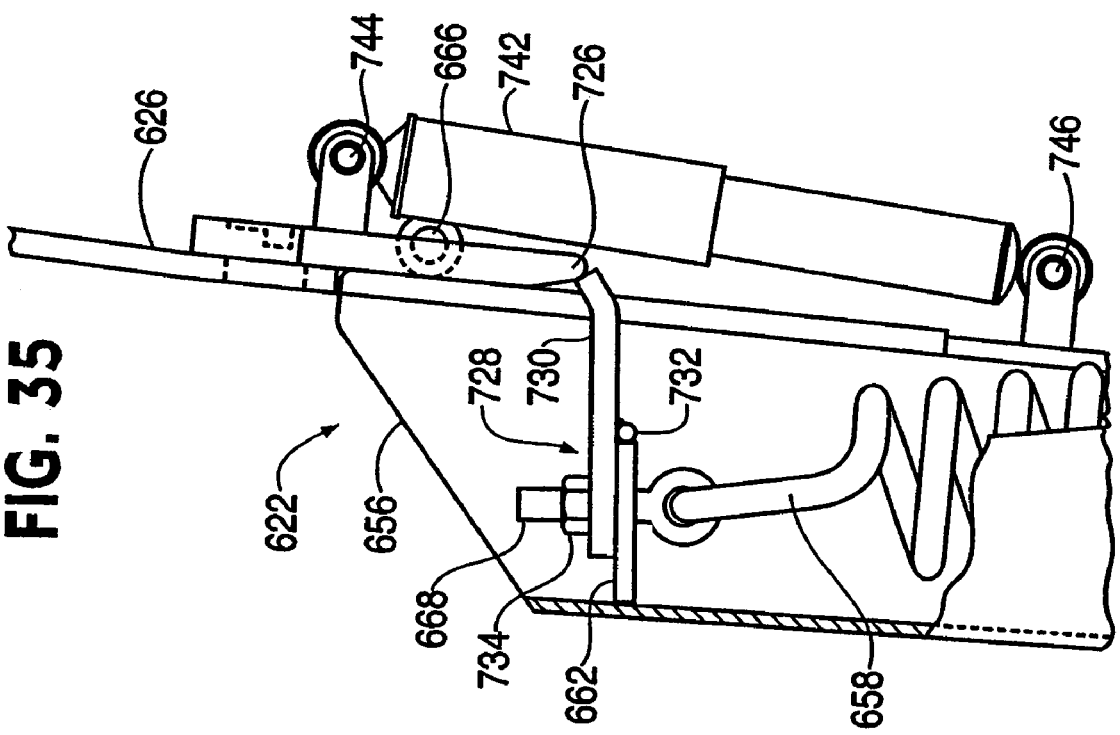

VERTICALLY-STORING DOCK LEVELER APPARATUS AND METHOD

CROSS-REFERENCE TO RELATED APPLICATIONS

This application claims priority to, and is a continuation-in-part, of U.S. patent applications entitled, "Vertically-Storing Dock Leveler Apparatus and Method" and "Spring Counterbalance Method and Apparatus for Variably Biasing a Dock Leveler", filed May 27, 2003, now U.S. Pat. No. 6,951,041 and Sep. 22, 2003, now U.S. Pat. No. 7,017,220 respectively, having a Ser. Nos. 10/444,971 and 10/664,971 respectively, (both still pending) the disclosures of which are hereby incorporated by reference in their entirety.

FIELD OF THE INVENTION

The present invention relates generally to dock levelers. More particularly the present invention relates to vertically-storing dock levelers. The present invention also relates to dock levelers that do not require a pit for installation.

BACKGROUND OF THE INVENTION

Dock levelers are used at loading docks to bridge the gap between a loading dock and the bed of a vehicle parked at the loading dock to facilitate the loading or unloading of the vehicle. For example, dock levelers enable material handling equipment, such as a fork truck, to move between the dock and the vehicle bed.

Installation of dock levelers generally falls into two categories: pit-style dock levelers and edge-of-dock levelers. Pit-style dock levelers are installed in a pit or cavity below the level of the dock floor so that the top of the dock leveler is at dock level when stored. Pit-style dock levelers are typically configured to store horizontally, but some pit-style dock levelers store vertically. Examples of pit-style dock levelers are described in U.S. Pat. Nos. 4,068,338 and 4,928,340. Examples of vertical-storing dock levelers are found in U.S. Pat. Nos. 4,825,493 and 5,001,799. Pit-style dock levelers generally have the ability to service transport vehicles up to twelve inches above or below dock level. These dock levelers are typically activated by hydraulic, pneumatic, or mechanical spring systems. Pit-style dock levelers can be expensive to install due to the expense of the pit. Pit-style dock levelers, particularly horizontally-storing pit-style dock levelers, can also have the drawback of being more difficult to ensure security and environmental control.

Edge-of-dock levelers are attached to the dock wall and therefore do not require a pit or shelf for installation. Examples of edge-of-dock levelers can be found in U.S. Pat. Nos. 4,665,579 and 4,689,846. Edge-of-dock levelers are typically smaller and of simpler construction than pit-style dock levelers. A drawback of edge-of-dock levelers is that they can have limited range above and below dock and steeper grades due to their relatively short lengths for fork trucks traveling over them.

A third type of dock installation that is known, but not widely used, is the horizontally-storing top-of-dock leveler. It is typically similar in construction to a horizontally-storing pit-style dock leveler but mounted on top of the dock without a pit. Top-of-dock levelers generally have limited below dock range and are generally used to service standard height trucks from a low dock. Also, top-of-dock levelers are generally used on an indoor dock, otherwise it requires that the door be modified to close properly.

Accordingly, it is desirable to provide a method and apparatus for bridging the gap between a dock and the end of a vehicle bed that can be installed economically such as with an edge-of-dock leveler, but which has greater vertical range and less steep grades than edge-of-dock levelers. It is also to desirable that the method and apparatus provide the security and environmental control of a vertically-storing dock leveler.

U.S. Pat. No. 3,411,168 is an example of a mechanically-operated, vertically-storing dock leveler. The illustrated dock leveler includes a spring counterbalance to assist in operation. The spring counterbalance mechanism includes a spring, a roller, a cam and an arm. The spring counterbalance tends to urge the dock leveler into the stored, vertical position. During operation, as the dock leveler rotates toward an operative position, the weight moment of the dock leveler overcomes the upward bias of the spring counterbalance and the dock leveler falls into its operative position.

U.S. Pat. No. 3,460,175 is another example of a mechanically-operated, vertically-storing dock leveler. The illustrated dock leveler includes both a spring counterbalance and pivotable weight to assist in operation. The spring counterbalance includes a spring, cam, and cam roller. The spring counterbalance upwardly biases the dock leveler, whereas the weight downwardly biases the dock leveler when the weight is rotated into its high moment position. In operation, when the dock leveler is rotated toward the horizontal position, the weight rotates from its low moment position to its high moment position. According to the specification, when the weight is in the high moment position, the moment about the pivotal connection of the deck assembly to the support means is sufficient to overcome the upward biasing action of the spring so that the deck assembly remains in the horizontal position. To re-store the dock leveler, the weight is rotated from the high moment position to the low moment position. According to the specification, when the weight is in the low moment position, the force provided by the spring is sufficient to rotate the dock leveler into the stored, vertical position.

A drawback of the above-described dock levelers is that the spring counterbalance upwardly biases the dock leveler throughout the rotation of the dock leveler. Accordingly, rotation of the dock leveler downward is made more difficult because the motion is against the force of the spring. Another drawback of the above-described dock levelers is that they require additional components such as the arm and cam roller.

Accordingly, it is desirable to provide a spring counterbalance method and apparatus for assisting the operation of a mechanically-operated, vertically-storing dock leveler that can upwardly bias the dock leveler at certain angles of rotation, downwardly bias the dock leveler at other angles of rotation, and/or neutrally bias the dock leveler at yet other angles of rotation. It is also desirable to provide a method and apparatus for assisting the operation of a mechanically-operated, vertically-storing dock leveler of desirable simplicity.

There is a risk that the dock leveler may unexpectedly raise if used with a transport vehicle that has a bed higher than a given working range of a particular dock leveler. As a result some dock levelers may inadvertently raise to an upwardly biased position and raise above the bed of the transport vehicle. This elevated position of the dock leveler would be undesirable for loading freight on and off a vehicle.

Another limitation of some dock levelers is that because the dock leveler is downwardly biased throughout the generally horizontal working range, it therefore requires great effort to lift it from the horizontal position.

SUMMARY OF THE INVENTION

The foregoing needs are met, to a great extent, by the present invention, wherein in one aspect an apparatus and method for bridging the gap between a dock and the end of a vehicle is provided that in some embodiments can be installed economically such as with edge-of-dock levelers, but which has greater range and less steep grades than edge-of-dock levelers.

In accordance with one embodiment of the present invention, a dock leveler is provided having a vertically-storing deck assembly pivotally connected to a base assembly, wherein the base assembly is configured to be installed on the top surface of a dock. Preferably, the deck assembly can pivot between the vertically-stored position, and lower, operating positions. In some embodiments, the lower, operating positions range from about six inches above dock to about eight inches below dock. In some embodiments, the deck assembly is pivotally attached to the base assembly at a moveable pivot axis, such that pivot axis can shift from a first position in the base assembly near the end of the dock to a second position in the base assembly farther from the end of the dock. Shifting the pivot axis from the first to the second position effectively reduces the distance the bridge formed by the deck assembly extends in front of the dock face. In some embodiments, the dock leveler also includes a lip assembly pivotally attached to the deck assembly. Pivotal rotation of the lip from an extended to a pendant position effectively shortens the length of the bridge (and thus reduces the distance the bridge extends in front of the dock face) formed by the deck assembly.

In accordance with another embodiment of the present invention, a dock leveler is provided comprising a base means for securing the dock leveler to a top surface of a dock, a vertically-storing means for bridging the gap between a dock and a vehicle backed against a dock, and a means for pivotally attaching the vertically-storing means to the base means. In some embodiments, the dock leveler also includes a means for varying the length of the bridge formed by the deck assembly. In some embodiments, the length-varying means is a lip assembly pivotally attached to the vertically-storing bridging means. In some embodiments, the length-varying means is a means for moving the pivotally-attaching means from a first position to a second position, wherein the first position is closer to the end of the dock than the second position.

In accordance with yet another embodiment of the present invention, a method for bridging the gap between a dock and a vehicle backed into a dock is provided which includes operating a vertically-storing, top-of-dock leveler by moving the top-of-dock leveler between a vertically-stored and a lowered operative position.

The foregoing needs are met, to a great extent, by the present invention, wherein in one aspect an apparatus is provided that in some embodiments can upwardly bias the dock leveler at certain angles of rotation, downwardly bias the dock leveler at other angles of rotation, and/or neutrally bias the dock leveler at yet other angles of rotation.

In accordance with one embodiment of the present invention, a dock leveler is provided that includes: a base assembly; a deck assembly configured to rotate from a generally vertical stored position to one or more lowered supported positions, wherein the deck assembly is pivotally coupled to the base assembly at a pivot point; and, a counterbalance assembly comprising: a first anchor point, a second anchor point, at least one effective anchor point, and a biasing member having a central longitudinal axis defining a line of action, wherein the biasing member is coupled to the deck assembly at the first anchor point and to the base assembly or dock at the second anchor point and wherein the at least one effective anchor point has a location along the line of action, and which location relative to the pivot point changes as the deck assembly rotates. According to some embodiments, the biasing member is a spring. According to some embodiments, the spring is coupled to the second anchor point by a flexible member and the base assembly comprises a cam plate having at least one cam surface shaped to deflect the line of action as the deck assembly rotates by selectively engaging the flexible member.

In accordance with another embodiment of the present invention, a counterbalance assembly for a mechanically-operated, vertically-storing dock leveler is provided. The counterbalance assembly includes: a tension means for counterbalancing the deck assembly of a dock leveler, wherein the tension means has a first end and a second end; a means for fixedly coupling the first end of the tension means to the deck assembly at a first anchor point; a means for flexibly coupling the second end of the tension means to a base assembly of the dock leveler at a second anchor point, wherein the first anchor point and the second anchor point define a direct line of action; and a camming means configured to selectively engage the means for flexibly coupling such that the tension means is deflected away from the direct line of action when the tension means is incorporated in the dock leveler and the deck assembly rotates.

In accordance with yet another embodiment of the present invention, a method for counterbalancing a mechanically-operating, vertically-storing dock leveler having a rotating deck assembly attached to a base assembly at a pivot point is provided. The method includes coupling a spring to the dock leveler with a flexible attachment device, and providing a camming surface configured to cooperate with the flexible attachment device to deflect the spring away from a direct line of action in response to the deck assembly rotation. In some embodiments, the camming surface is shaped to cause the spring to deflect toward the pivot point as the deck assembly rotates downward. "Direct line of action" should be understood to mean the straight line defined by the fixed anchor points to which the spring is coupled, which may or may not overlap the "line of action" defined by the central longitudinal axis of the spring.

In accordance with another embodiment of the present invention, a dock leveler is provided. The dock leveler includes: a base assembly mountable to a surface of a dock floor; a deck assembly configured to rotate between a generally vertical stored position to one or more lowered operating positions, wherein the deck assembly is pivotally coupled to said base assembly; a spring counterbalance assembly operatively connected to the deck assembly and base assembly, wherein the spring counter balance assembly causes the deck assembly to be downwardly biased throughout the generally horizontal working range, and the deck assembly to be upwardly biased at positions above the working range; and a hold down assembly engageable with the spring counterbalance assembly when the deck assembly is in the generally horizontal working range, wherein the hold down assembly, when engaged with the spring counterbalance assembly, causes the deck assembly to remain downwardly biased when it is raised above the working range.

In accordance with another embodiment of the present invention, a dock leveler is provided. The dock leveler includes: a base assembly mountable to a surface of a dock floor; a deck assembly configured to rotate between a generally vertical stored position to one or more lowered operating positions, wherein the deck assembly is pivotally coupled to said base assembly; a spring counterbalance assembly operatively connected to the deck assembly and base assembly, wherein the spring counter balance assembly causes the deck assembly to be downwardly biased throughout the generally horizontal working range, and the deck assembly to be upwardly biased at positions above the working range; and a lever mechanism configured to raise the deck assembly toward a generally vertical stored position.

In accordance with another embodiment of the present invention, a dock leveler is provided. The dock leveler comprises: a base assembly mountable to a surface of a dock floor; a deck assembly configured to rotate between a generally vertical stored position to one or more lowered operating positions, wherein the deck assembly is pivotally coupled to said base assembly; means for counterbalancing the deck assembly, wherein the deck assembly is downwardly biased throughout the generally horizontal working range; means for moving the deck assembly between a raised and lowered position; and means for ratcheting mechanism configured to engage the moving means and the deck assembly at more than one angle relative to one another, wherein the ratcheting means is configured to disengage the lever assembly from the deck assembly when the deck assembly is in the generally horizontal working range, and wherein the ratcheting means is configured to engage the moving means with the deck assembly when the deck assembly is rotated above the working range.

In accordance with another embodiment of the present invention, a dock leveler is provided. The dock leveler comprises: a base assembly mountable to a surface of a dock floor; a deck assembly configured to rotate from a generally vertical stored position to one or more lowered operating positions, wherein the deck assembly is pivotally coupled to said base; a lip pivotally coupled to said deck assembly and configured to rotate from an extended position generally parallel to the deck assembly to a retracted position generally perpendicular to the deck assembly; and a latch configured to selectively hold the lip in the extended position.

In accordance with another embodiment of the present invention, a vertically storing dock leveler is provided. The dock leveler comprises: a support structure mountable to a loading dock; a deck assembly pivotally mounted to the support structure and configured to move between a substantially vertical position and a working position; a counterbalance assembly comprising a spring connected to the support structure and the deck assembly, the spring having a moveable effective anchor point at one end; wherein a line of action of the spring moves as the effective anchor point moves; and a hold down mechanism selectively dis-engageable and configured to cause the deck assembly to remain downwardly biased when it is raised above a working range when the hold down mechanism is engaged.

In accordance with another embodiment of the present invention, a method of operating a dock leveler where the dock leveler comprises: a support structure mountable to a loading dock; a deck assembly pivotally mounted to the support structure and configured to move between a substantially vertical position and a working position; a counterbalance assembly comprising a spring connected to the support structure and the deck assembly, the spring having a moveable effective anchor point at one end, wherein a line of action of the spring moves as the effective anchor point moves; a hold down mechanism selectively dis-engageable and configured to cause the deck assembly to be downwardly biased when the deck assembly is in, or raised above, a working range when the hold down mechanism is engaged; a lifting mechanism configured to permit an operator to actuate the lifting mechanism and raise the deck assembly from a working range to a stored position; a storage latch mechanism; and a storage latch disengaging mechanism configured to selectively disengage the storage latch mechanism. The method comprises: releasing the storage latch mechanism by activating the storage latch disengaging mechanism; and lowering the deck assembly.

In accordance with another embodiment of the present invention, a lip assembly for a dock leveler is provided. The lip assembly comprises: a frame; a deck assembly pivotally connected to the frame; a lip pivotally connected to the deck assembly; a spring connected to the frame at one end and the deck assembly at the other end, the spring biasing the deck assembly; a lip latch biased to a first position; and a latch bar attached to the lip and configured to communicate with the lip latch such that lip latch urges the latch bar to remain in a position to resist the lip retracting when the lip near the extended position.

In accordance with another embodiment of the present invention, a lip assembly for pivoting a lip about a deck assembly of a vertical storing dock leveler is provided. The lip assembly comprises: a lip pivotally connected to the deck assembly and movable between a pendant position generally perpendicular to the deck assembly and an extended position generally parallel to the deck assembly; a latch link pivotally connected to the lip at one end of the latch link and the other end of the latch link having at least one engaging surface; a crank arm connected to the latch link at one end of the crank arm and another end of the crank arm is connected to the deck assembly; and biasing means configured to urge the crank arm to urge the latch link to urge the lip to the extended position.

In accordance with another embodiment of the present invention, a method operating a dock leveler is provided. The method comprises: inserting a lip actuator into a lip actuator receiver; rotating the lip by rotating the lip actuator; and lowering a dock leveler from a substantially vertical position.

In accordance with another embodiment of the present invention, a dock leveler is provided. The dock leveler comprises: a frame configured to be mounded to a loading dock; a deck assembly having a top surface, the deck assembly pivotally mounted to the frame; and a counter balancing spring mounted at one end to the deck assembly and mounted to the frame at the other end, the counter balancing spring having a line of action located substantially above a pivot axis of the deck assembly.

In accordance with another embodiment of the present invention, a dock leveler is provided. The dock leveler comprises: a frame configured to be mounded to a loading dock; a deck assembly having a top surface pivotally mounted to the frame; and means for counter balancing the deck assembly mounted at one end to the deck assembly and mounted to the frame at the other end, the counter balancing means located substantially above the top surface of the deck assembly.

In accordance with another embodiment of the present invention, a method for protecting the counter balance mechanism for a dock leveler is provided. The method comprises: locating a dock leveler deck assembly counter balance mechanism to one side of a deck assembly; providing at least one curb along at least one edge of the deck assembly; and housing, at least in part, the counter balance mechanism with the at least one curb.

In accordance with another embodiment of the present invention, a dock leveler is provided. The dock leveler comprises: a support structure configured to be mounted to a top surface of a loading dock; a deck assembly pivotally connected to the support structure, the deck assembly having a top surface; and a ramp defining a transition surface between the top surface of the loading dock and the deck assembly top surface, the ramp attached to the support structure and ending substantially at a pivot point of the deck assembly.

In accordance with another embodiment of the present invention, a dock leveler is provided. The dock leveler comprises: means for pivotally supporting a deck assembly configured to be mounted to a top surface of a loading dock; a deck assembly pivotally connected to the supporting means; and means for providing a transition between a dock floor and the deck assembly the transition means attached to the supporting means and configured to provide a transition surface generally upward inclined from the dock floor to the deck assembly.

In accordance with another embodiment of the present invention, a method of provided a bridge between a vehicle bed and a dock floor is provided. The method comprises: lowering a deck assembly from a vertical position to a working position; and providing an upwardly inclined transition piece configured to aid a wheel in moving between the dock floor and the deck assembly, wherein the transition piece and the lowered deck assembly comprise the bridge.

In accordance with another embodiment of the present invention, a platform attachable to a loading dock is provided. The platform comprises a plate configured to attach to a loading dock adjacent to a dock face.

In accordance with another embodiment of the present invention, a system for reducing the likelihood of objects falling between bumpers mounted to a loading dock is provided. The system comprises: a barrier attached to a loading dock adjacent to a vertical storing dock leveler wherein the barrier is beneath a deck assembly portion of the dock leveler when the dock leveler is in a substantially horizontal position; and bumpers attached to the loading dock and located at either end of the barrier.

In accordance with another embodiment of the present invention, a system for reducing the likelihood of objects falling between bumpers mounted to a loading dock is provided. The system comprises: means for supporting a dock worker attached to a loading dock adjacent to a vertical storing dock leveler wherein the supporting means is beneath a deck assembly portion of the dock leveler when the dock leveler is in a substantially horizontal position; and bumpers attached to the loading dock and located at either end of the supporting means.

In accordance with another embodiment of the present invention, a method of reducing the likelihood of objects falling between bumpers mounted to a loading dock is provided. The method comprises: mounting bumpers to the loading dock; and mounting a barrier adjacent to a loading dock face between the bumpers.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is an exploded perspective view of the base assembly of the vertically-storing, top-of-dock leveler of FIG. 1.

FIG. 3 is a side view of the vertically-storing, top-of-dock leveler of FIG. 1 shown in a lowered, above-dock operative position.

FIG. 4 is a is a side view of the vertically-storing, top-of-dock leveler of FIG. 1 shown in a lowered, below-dock operative position.

FIG. 19 is a graphical illustration of the relative magnitude of the weight and spring rotational moments of the preliminary configuration of a tension spring counter balance mechanism of FIG. 17 as the center of gravity is rotated from a vertical to a horizontal position.

FIG. 20 is a graphical illustration of an exemplary net moment profile in accordance with the present invention, resulting from the weight and spring rotational moments as the center of gravity is rotated from a vertical to a horizontal position.

FIG. 21 is a perspective view illustrating a vertical storing dock leveler according to a preferred embodiment of the invention, wherein the dock leveler is lowered to the generally horizontal operative range.

FIG. 22 is a cut away side view of the dock leveler of FIG. 21, lowered to the generally horizontal operative range with the lip resting on the bed of a truck, illustrating the spring counter balance mechanism.

FIG. 35 is an enlarged partial view of the lip latch mechanism illustrating the lip held extended by the lip latch.

FIG. 36 is an enlarged partial view of the lip latch mechanism illustrating the lip rotated slightly past the latched position.

DETAILED DESCRIPTION

Figure 1:
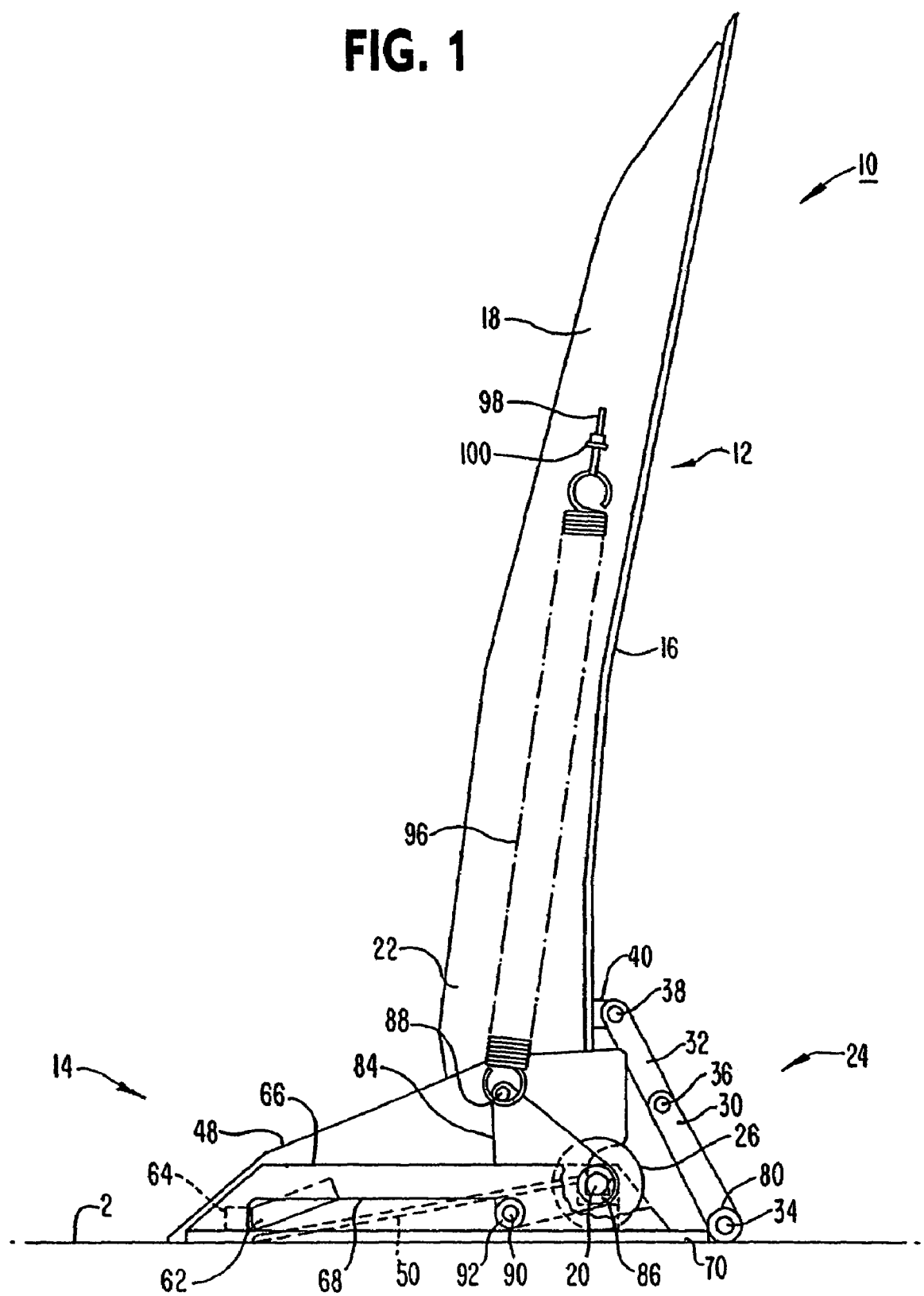
FIG. 1 is a side view illustrating a vertically-storing, top-of-dock leveler according to a preferred embodiment of the invention in the vertically-stored position.

The invention will now be described with reference to the drawing figures, in which like reference numerals refer to like parts throughout. An embodiment in accordance with the present invention provides a vertically-storing, top-of-dock leveler. Such devices in accordance with some embodiments of the invention have the advantage of being more economical to install and provide greater environmental and security control than typical pit-style dock levelers, while also having a greater range of operative positions than typical edge-of-dock and top-of-dock levelers.

FIG. 1 illustrates a dock leveler 10 in accordance with one embodiment of the present invention. The dock leveler 10 includes a deck assembly 12 pivotally attached to a base assembly 14 and a lock mechanism 24. The deck assembly 12 includes a deck plate 16 supported by side curbs 18, and a pivot shaft 20 attached to the rear end 22 (i.e. the end closest to the base assembly 14 and farthest from the vehicle bed when the deck assembly 12 is in an operative position) of the deck plate 16. The pivot shaft can be supported at each end by a roller 26 that rests on the base assembly 14, and specifically the base plate 70 of the base assembly 14. The deck plate 16 preferably is not flat and occupies at least two planes. When the deck plate 16 occupies two planes, the intersection of the planes preferably is located near the plane of the dock face 4 when the deck plate 16 is in the lowered, substantially horizontal position. As shown in FIG. 3, the deck plate 16 has a first surface 15 occupying a first plane, a second surface 17 occupying a second plane, and the intersection 19 of the first surface 15 and second surface 17 (and consequently the intersection of the first and second planes) is located near the plane of the dock face 4. Such a configuration—i.e. a deck plate configured to occupy more than one plane—enables the dock leveler to achieve a lesser below dock grade as compared to conventional dock levelers having a flat deck plate occupying only a single plane, particularly when the intersection of the planes is located in the plane of the dock face or above the dock floor. A person of ordinary skill will understand from the teachings herein that the deck plate may comprise at least a first or second portion, which may be but are not necessarily planar. Rather, an angle exists between the first and second portion near the plane of the dock face thereby minimizing the grade when the truck is below dock. Thus, for example a first planar portion may extend from the truck bed to a location near the dock face and the second portion may be a curved portion extending to the dock hinge or else a curved portion extending to a planar portion connected to the dock hinge.

Referring back to FIG. 1, the lock mechanism 24 includes a lower link 30 and an upper link 32. The lower link 30 has one end pivoting about a pin 34 carried by the base assembly 14 and the other end pivoting about a pin 36 attached to one end of the upper link 32. The other end of the upper link 32 pivots about a pin 38 carried by a bracket 40 attached to the deck assembly 12. When the deck assembly 12 is in the raised (i.e. vertically-stored) position, the links 30, 32 rotate to an over-center position to lock the deck assembly 12 into the raised position. As shown in FIGS. 3 and 4, the links 30, 32 rotate relative to each other to allow the deck assembly 12 to lower.

The base assembly 14, shown in a detailed, exploded view in FIG. 2 includes a ramp assembly 42, two spring anchor assembles 44, and two base plate assemblies 46. The ramp assembly 42 has two side plates 48 supporting an inclined ramp plate 50, and a pivot shaft engagement mechanism 52. In the illustrated embodiment, the pivot shaft engagement mechanism is a support channel and will thus be referred to as a support channel 52 from hereon in. The pivot shaft engagement mechanism need not be a support channel, however; anything that positions the pivot shaft 20 when the ramp assembly 42 is latched, and further allows the pivot shaft 20 to move with the ramp assembly 42 when the ramp assembly is de-latched and moved rearwardly (i.e. away from the face of the dock) can be a pivot shaft engagement mechanism.

The side plates 48 have an inside surface 56 (facing the ramp plate 50), an outside surface 58 (opposite the ramp plate 50), a forward end 54 (the end nearest the dock face 4), and a rear end 60 (the end farthest from the dock face 4). A latch block 62 is attached to the outside surface 58 of each side plate 48 toward the rear end 60 of each side plate 48, for engagement with corresponding latch blocks 64 on the base plate assembly 46.

The inclined ramp plate 50 extends at an upward incline from the dock floor (not shown in FIG. 2) to the pivoting end of the deck assembly 12. The support channel 52 can be formed integrally with the ramp plate 50, or it can be a separate portion attached to the ramp plate 50. As shown in FIG. 2, the forward end 54 (i.e. the end nearest the dock face 4) of the ramp plate 50 rests on the support channel 52. Thus, in the illustrated embodiment, the support channel 52 is a separate portion from the ramp plate 50. The support channel 52 is configured to receive the pivot shaft 20 of the deck assembly 12.

The base plate assemblies 46 each include a side plate 66 with a cam slot 68. Each side plate 66 is mounted to a base plate 70 which is ultimately attached to the dock floor. The side plates 66 have an inside surface 72 (facing the ramp assembly 42), and outside surface 74 (opposite the ramp assembly 42), a forward end 76 (the end nearest the dock face 4), and a rear end 78 (the end farthest the dock face 4). A latch block 64 is attached the inside surface 72 of each base side plate 66 toward the rear end 78 of each base side plate 66 for engagement with the latch blocks 62 of the ramp assembly 42. The base plate assemblies 46 also include a pivot boss 80 attached at the forward end 82 (i.e. the end nearest the dock face 4) of the base plate 70 for receiving the pin 34 which attaches to the lower link 30 enabling pivoting motion.

Each spring anchor assembly 44 includes a plate assembly 94. One plate assembly 94 is mounted on each end of the pivot shaft 20, between the ramp assembly 42 and base plate assembly 46. Each plate assembly 44 has a plate 84, a support bushing 86, a pin 88, and a pin 90 carrying a cam roller 92. The cam roller 92 fits within, and is positioned within, the cam slot 68. Each spring anchor assembly 44 also includes a spring 96 with an upper end fastened to an adjusting bolt 98 attached to a plate 100 mounted on a side curb 18 and a lower end attached to the pin 88 on the plate assembly 94. In some embodiments, rotation of the plate assembly 94 is prevented by the cam roller 92 bearing on the cam surface 102 of the base plate assembly 46. The locations of the pin 88 and the plate 84, and the rate of the spring 96 are preferably selected so that the deck 16 is upwardly biased when the dock leveler 10 is in the stored position and downwardly biased when the deck assembly 12 is lowered to an operative position.

Figure 6:
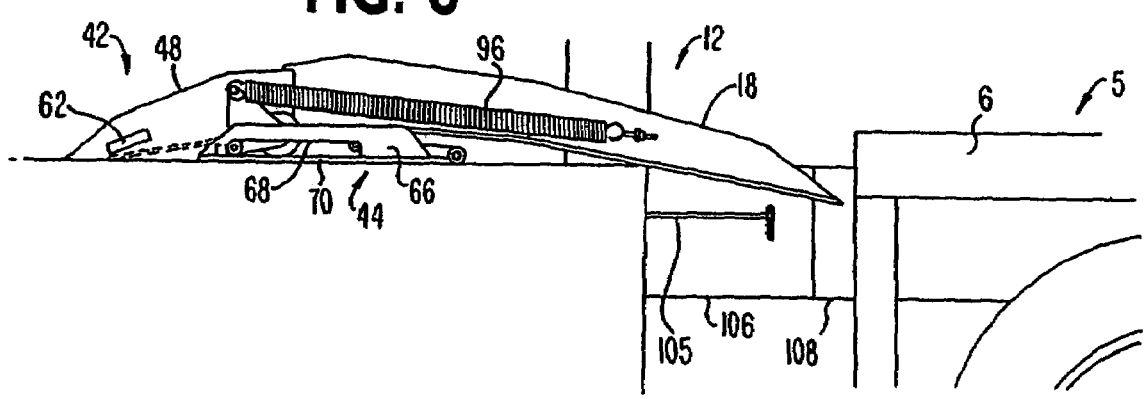
FIG. 6 is a side view of the vertically-storing, top-of-dock leveler of FIG. 1 shown in a lowered, operative position with the deck assembly and the ramp moved away from the dock face for end-loading.

Whereas FIG. 1 illustrates the dock leveler in a stored position, FIGS. 3, 4, and 6 illustrate the same dock leveler installed on the top surface (or floor) 2 of a dock 1 with a vehicle 5 parked on the dock driveway 3 and backed against the bumpers 108. On either side of the dock leveler 10, a bumper assembly 104 is attached to the dock face 4. The bumper assembly 104 includes a bumper bracket 106 and a resilient bumper 108. The bumpers 108 protect the dock face 4 from impact and position the transport vehicle 5 at the desired position relative to the dock leveler 10. A shelf 105 is supported between the bumper assemblies 104.

As FIGS. 1, 3, and 4 indicate, the dock leveler 10 is adapted to bridge the gap between the loading dock 1 and the bed 6 of a transport vehicle 5 parked in front of the loading dock 1. As discussed above, the dock leveler 10 includes two base plate assemblies 46 mounted on the dock floor 2, a ramp assembly 42 resting on the dock floor 2 between the two base plate assemblies 46, and a deck assembly 12 pivoted to the base ramp assembly 42 and base plate assemblies 46. The deck assembly 12 is moveable between a generally vertical stored position to a lowered, generally horizontal operative position that may be upwardly inclined or downwardly declined to provide a bridge from the dock floor 2 to a transport vehicle bed 6 that may be higher or lower than the dock floor 2. FIG. 1 illustrates the dock leveler in the stored position. FIG. 3 illustrates the dock leveler in a lowered, above-dock operative position. FIG. 4 illustrates the dock leveler in a lowered, below-dock operative position.

FIG. 6 illustrates the dock leveler 10 in another lowered operative position for accommodating an end-loading condition. In normal operation, the ramp assembly 42 is prevented from moving by the latch blocks 62 engaging the latch blocks 64 on the base plate assemblies 46. When the links 30,32 are rotated from the locked over-center position, the deck assembly 12 can be rotated and lowered to an operative position resting on a vehicle bed 6 as illustrated in FIGS. 3 and 4. When cargo is close to the rear of the truck 5, it may interfere with the end of the deck assembly 12 and prevent the deck assembly 12 from resting on the bed of the truck 6. This is known as an end-loading condition.

Figure 5:
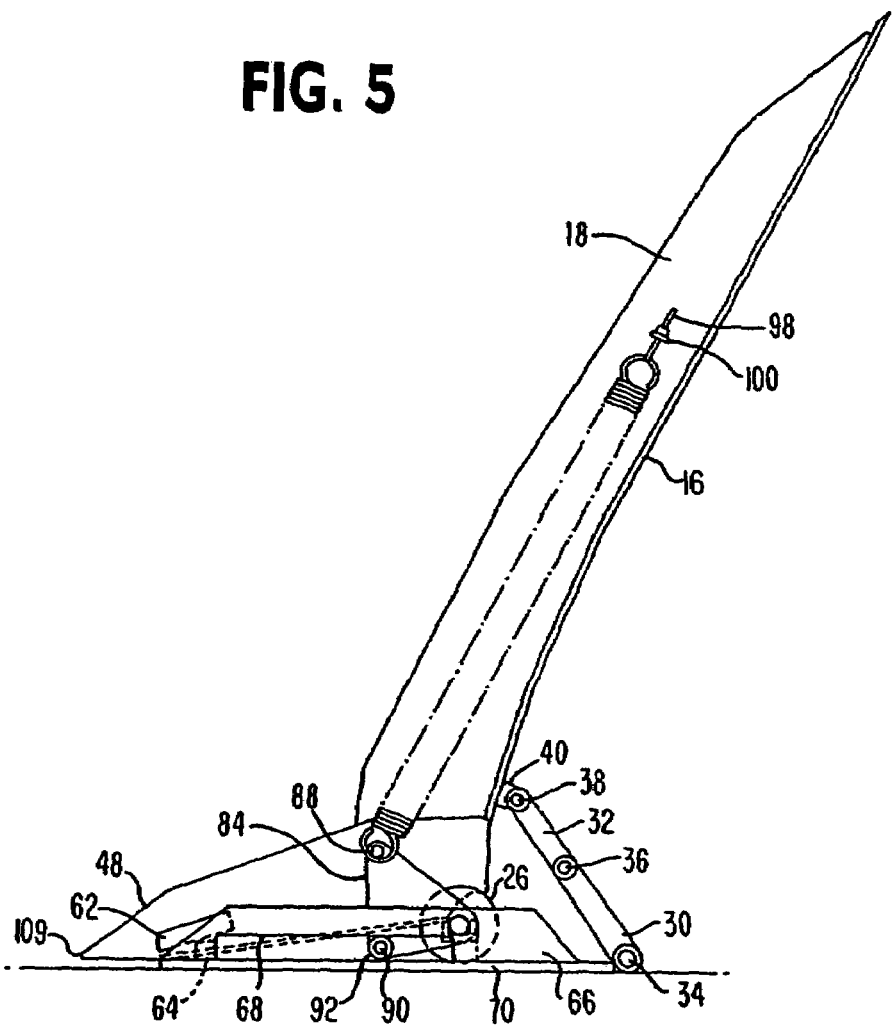
FIG. 5 is a side view of the vertically-storing, top-of-dock leveler of FIG. 1 shown in a partially-lowered position with the deck assembly and the base of the dock leveler moving away from the face of the dock.

To allow the deck assembly 12 to be lowered for end loading, the links 30, 32 remain locked in the over-center position. The rear 109 of the ramp assembly 42 is raised to disengage the latch blocks 62 from the latch blocks 64. When the deck assembly 12 is pushed rearward and pivoted toward a lowered position, the links 30, 32 cause the pivot shaft 20 and the ramp assembly 42 to move rearward. This is illustrated in FIG. 5. The rollers 26 bearing on the base plates 70 carry the weight of the deck assembly 12. The spring plate assembly 94 also moves rearward with the pivot shaft 20. The cam roller 92 moves along the cam surface 102 to maintain the angular position of the spring plate assembly 94 and thus the counterbalance force of the springs 96 is not affected by the position of the pivot shaft 20. Preferably, when the deck assembly 12 is lowered to an operative position, it does not protrude beyond the front face of the bumpers 108 and end-loading can be performed as illustrated in FIG. 6. A person of ordinary skill in the art will appreciate that although the illustrated embodiments refer to manual mechanisms for raising and lowering the deck assembly 12, dock leveler operation can also be accomplished mechanically by means known in the art, for example by hydraulic or electric actuating mechanisms.

When the deck assembly 12 is raised, the pivot shaft 20 moves forward to the normal position shown in FIG. 1. The front leg 110 of the support channel 52 engages the pivot shaft 20 and causes the ramp assembly 42 to move forward. When the ramp assembly 42 is fully forward the latch blocks 62 engage the latch blocks 64 on the base plate assemblies 46 and secure the ramp assembly 42 and the pivot shaft 20 in the normal position.

FIGS. 7–10 illustrate a dock leveler 200 according to another embodiment of the present invention.

The dock leveler 200 includes a deck assembly 212, base assembly 214, lip assembly 300, and lock mechanism 24. The deck assembly 212 is similar to the deck assembly 12 shown in FIG. 1 and includes a deck plate 216 supported between two side curbs 218, and a pivot shaft 220 attached to the rear end 222 of the deck plate 216.

The base assembly 214, similar to the base assembly 14 of FIG. 1, includes a ramp assembly 242. However, rather than having base plate assemblies configured for attachment to the top surface of a dock, the ramp assembly 242 itself is configured for attachment to the top surface of a dock. The ramp assembly 242 has two side plates 48 supporting an inclined ramp plate 50, and a support channel 52 for receiving the pivot shaft 220. The base assembly 214 also includes a base plate 270 that is attached to the dock floor 2. A pivot boss 280 is attached at the forward end of the base plate 270 for receiving the pin 34 which attaches to the lower link 30 of the lock mechanism 24.

In lieu of the spring anchor assembly 44 in the embodiment of FIG. 1, the dock leveler 200 has a spring 96 with an upper end fastened to an adjusting bolt 98 attached to a plate 100 mounted on a side curb 218 and a lower end attached to a pin 253 attached to the outside (i.e. the side opposite the inclined ramp plate 50) of each side plate 48. The locations of the pin 253 and the plate 100 and the rate of the spring 96 are selected so that the deck assembly 212 is upwardly biased when the deck plate 216 is in the stored position and downwardly biased when the deck plate 216 is lowered to an operative position.

Figure 7:
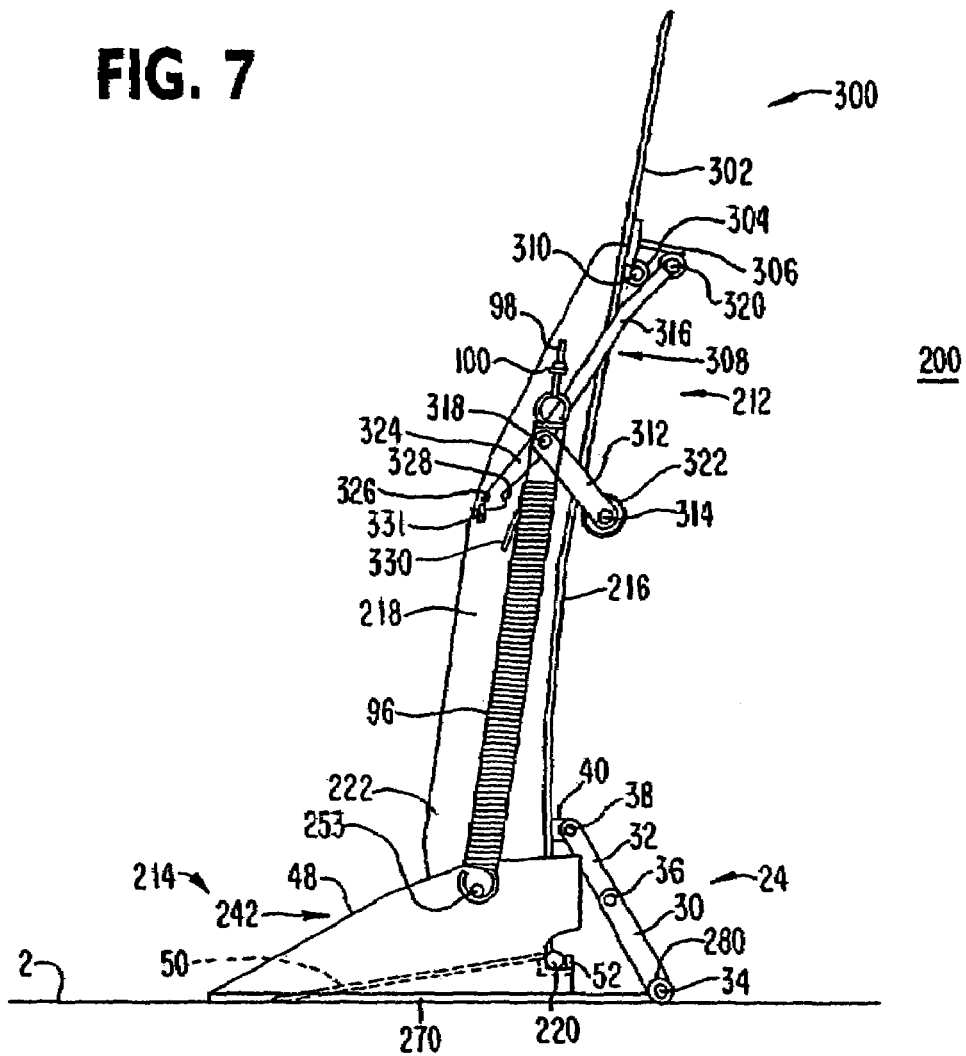
FIG. 7 is a side view illustrating a vertically-storing, top-of-dock leveler according to another preferred embodiment of the invention in the vertically-stored position, with the lip extended.
Figure 8:
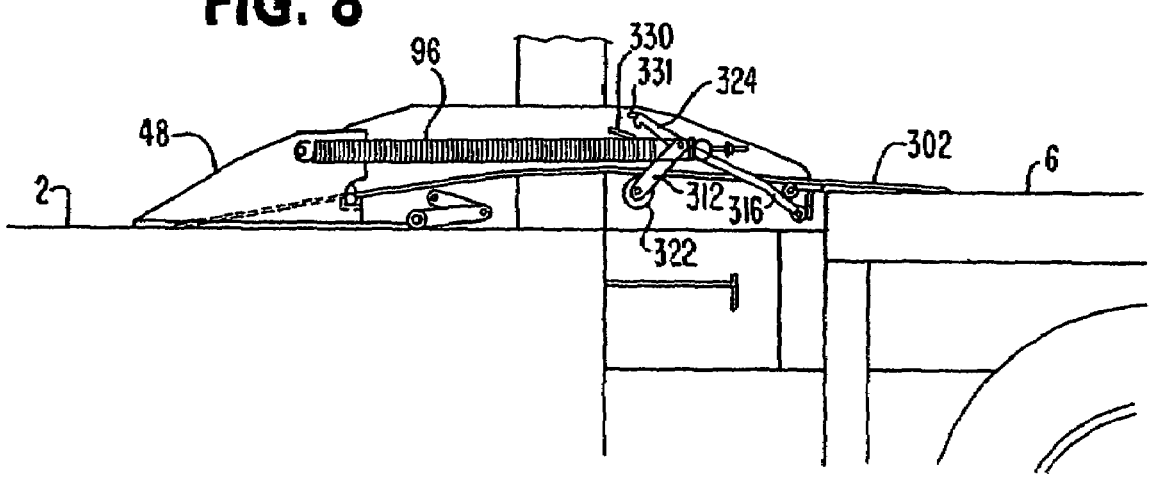
FIG. 8 is a side view illustrating the vertically-storing, top-of-dock leveler of FIG. 7 in a lowered, operative position with the lip extended.
Figure 9:
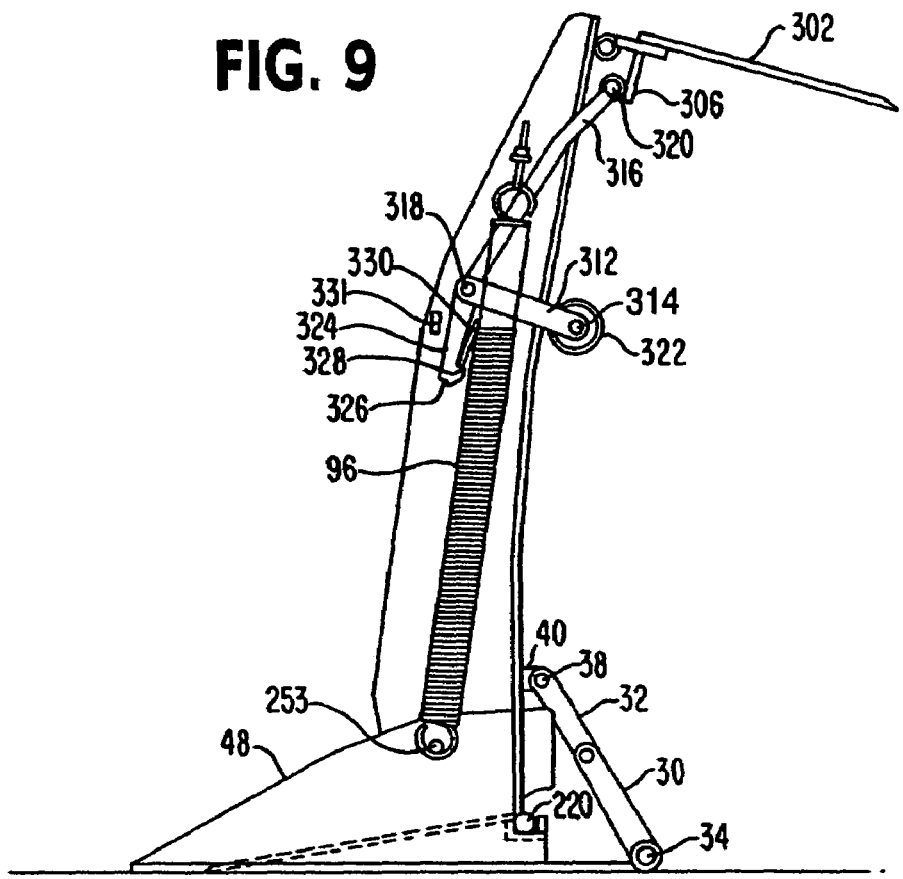
FIG. 9 is a side view illustrating the vertically-storing, top-of-dock leveler of FIG. 7 in the vertically-stored position, with the lip retracted.
Figure 10:
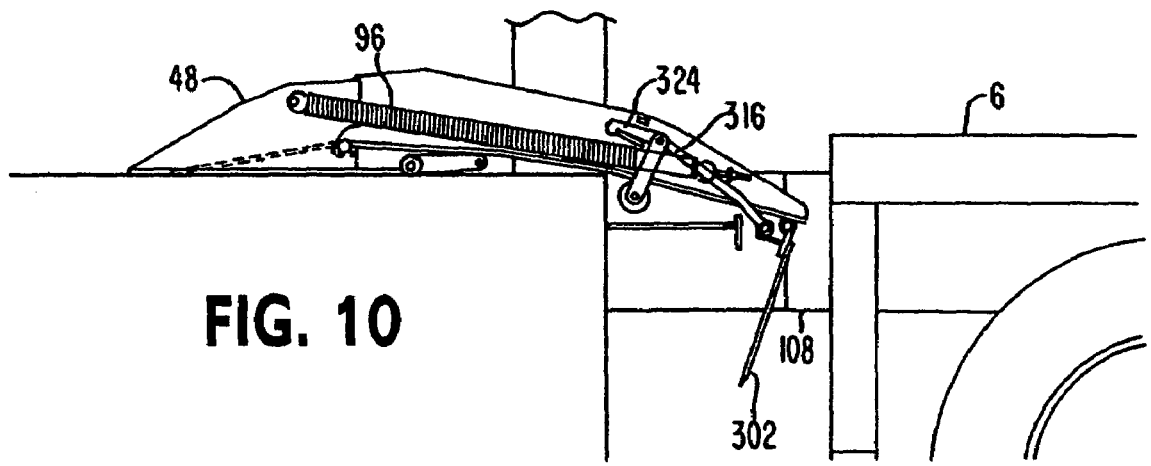
FIG. 10 is a side view illustrating the vertically-storing, top-of-dock leveler of FIG. 7 in a lowered, operative position with the lip retracted.

The lip assembly 300 includes a lip plate 302, hinge tubes 304, a lip arm 306, and counterbalancing mechanism 308. The lip assembly 300 is attached to the deck assembly 212 by a hinge pin 310. To reduce the effort required to rotate the lip plate 302 from the retracted position (i.e. perpendicular to the deck plate 216, as shown in FIG. 9) to the extended position (i.e. parallel to the deck plate 216, as shown in FIG. 7), the weight of the of the lip plate 302 is partially counterbalanced. A crank arm 312 is attached to a shaft 314 mounted on the deck assembly 212. A link 316 is attached at one end to the crank arm 312 by a pin 318 and at the other end to the lip arm 306 by a pin 320. A torsion spring 322 biases the crank arm 312 in a clockwise direction to urge the lip plate 302 to rotate in a counterclockwise direction toward the extended position. A lip latch 324 has two latching surfaces 326, 328. When the lip plate 302 is rotated to the extended position, as shown in FIGS. 7 and 8, the latch surface 326 engages a latch block (also referred to as a latch lug) 331 on the deck assembly 212 and prevents the lip plate 302 from rotating toward the retracted position. When the lip plate 302 is retracted as shown in FIGS. 9 and 10, the latch surface 328 engages a latch block 330 on the deck assembly 212 and prevents the lip plate 302 from rotating toward the extended position.

As with the embodiment of FIG. 1, in the embodiment of FIG. 7, the deck assembly 212 is moveable between a generally vertical, stored position and a generally horizontal, operative position. The generally horizontal, operative position may be upwardly inclined or downwardly declined to provide a bridge from the dock floor to a transport vehicle that may be higher or lower than the dock floor. FIG. 7 illustrates the dock leveler 200 in the stored position with the lip assembly 300 extended. FIG. 9 illustrates the dock leveler 200 in the stored position with the lip assembly 300 retracted. FIG. 8 illustrates the dock leveler in the substantially horizontal, lowered operative position with the lip extended.

In normal operation, the links 30, 32 are rotated from the locked over-center position and the deck assembly 212 is pushed forward to rotate to a lowered operative position with the lip plate 302 resting on the bed 6 of a truck 5 as shown in FIG. 8. When cargo is close to the rear of the truck 5, it may interfere with the end of the lip plate 302. End-loading can be performed by releasing the lip latch 324 and rotating the lip plate 302 forward to the retracted position as illustrated in FIG. 9. Thus, when the deck assembly 212 is lowered the lip plate 302 is behind the bed 6 of the truck 5 as illustrated in FIG. 10.

Thus the dock leveler of FIG. 1 and the dock leveler of FIG. 7 are examples of embodiments of vertically-storing, top-of-dock levelers according to the present invention that can accommodate end loading conditions. According to the embodiment of FIG. 1, end loading is accommodated by shifting the pivot point of the deck assembly farther from the dock face 4. Preferably the pivot point is shifted to an extent whereby the dock leveler does not protrude past the face of the dock bumper 108. According to the embodiment of FIG. 7, the bridge between the dock and the vehicle bed is effectively shortened through use of a pivoting lip mechanism—the bridge is longer when the lip is extended and shorter when the lip is retracted.

Figure 11:
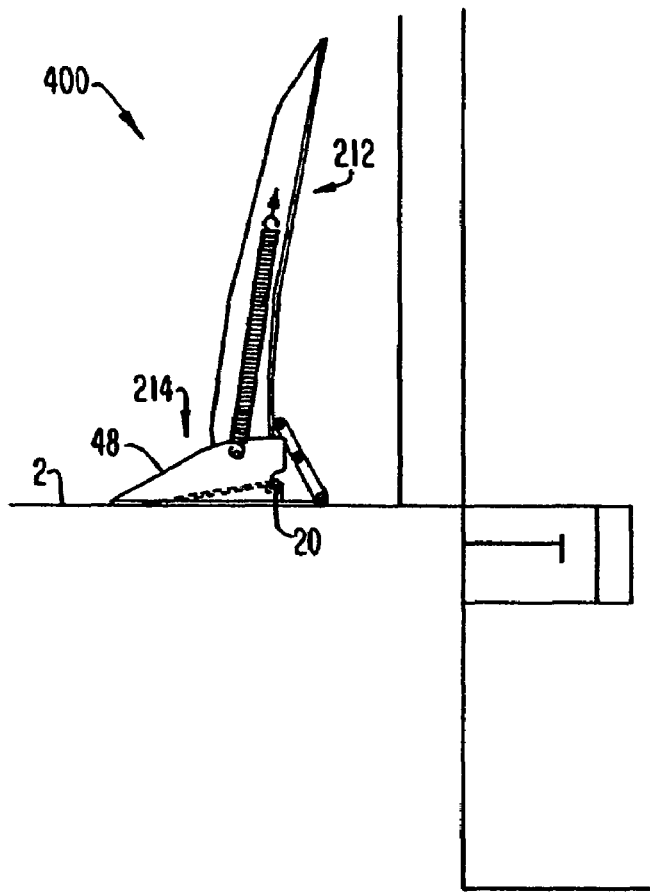
FIG. 11 is a side view illustrating a vertically-storing, top-of-dock leveler in accordance with yet another preferred embodiment of the present invention in the vertically-stored position.
Figure 12:
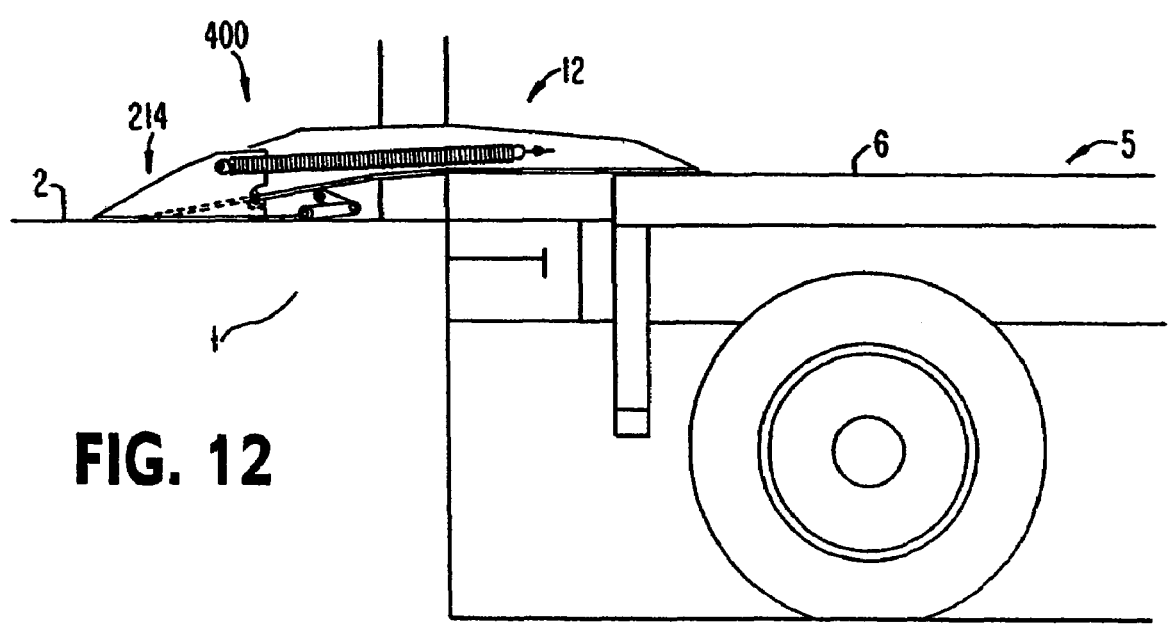
FIG. 12 is side view of the vertically-storing, top-of-dock leveler of FIG. 11 in a lowered, operative position.

FIGS. 11 and 12 illustrate a dock leveler 400 according to yet another embodiment of the present invention. FIG. 11 illustrates the dock leveler 400 in a vertically-stored position, attached to the dock floor 2. FIG. 12 illustrates the dock leveler 400 in a substantially horizontal, lowered operative position, resting on the bed 6 of a vehicle 5 backed against the dock. The dock leveler 400 is a combination of the dock levelers 10, 200 shown in FIGS. 1 and 7 in that it has the deck assembly 12 according to FIG. 1 attached to the base assembly 214 according to FIG. 7. Thus, as illustrated in FIG. 12, the operation of the dock leveler 400 is the similar to the normal operation of the dock levelers of FIGS. 1 and 7. Further, the dock leveler 400 is not designed to accommodate an end-loading condition because the deck assembly 12 pivot axis 20 cannot shift from a first position close to the dock face 4 to a second position farther from the dock face 4, and because the deck assembly 12 does not include a lip assembly.

Other embodiments of the invention are shown in FIGS. 13–20 and will be described below.

An embodiment in accordance with the present invention provides a counterbalance assembly for use with a mechanically-operated, vertically-storing dock leveler having a deck assembly connected to a base assembly at a pivot point, wherein the counterbalance assembly comprises a spring counterbalance configured for attachment to the deck assembly of a dock leveler at one end and for attachment to the base assembly of the dock leveler or to the dock itself at the other end. The longitudinal central axis of the spring defines a line of action, and the spring is attached at both ends to the dock leveler or at one end to the dock leveler and at the other end to the dock in such a manner that the position of the line of action relative to the direct line of action can change as the deck assembly rotates. Such a counterbalance assembly can upwardly bias the dock leveler at certain angles of rotation, downwardly bias the dock leveler at other angles of rotation, and/or neutrally bias the dock leveler at yet other angles of rotation.

Figure 13:
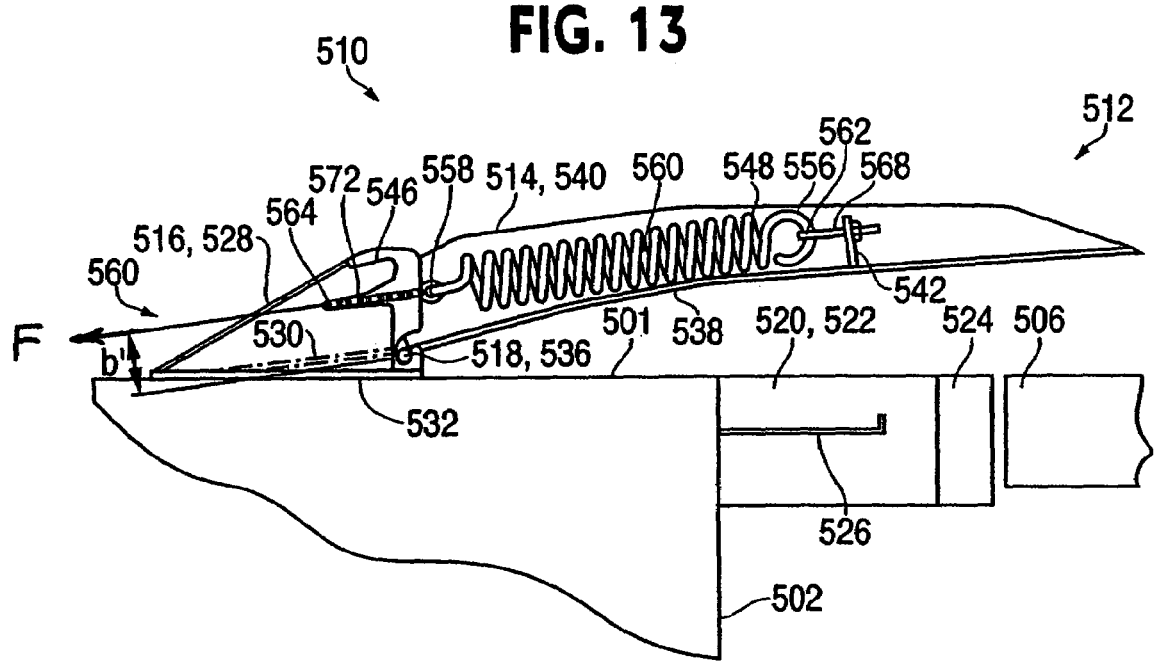
FIG. 13 is a side view illustrating a dock leveler incorporating a counterbalance mechanism according to a preferred embodiment of the invention, wherein the dock leveler is lowered near the generally horizontal operative position.

An embodiment of the present inventive counterbalance assembly 510 is shown incorporated into a vertically-storing, mechanically-operated dock leveler 512 in FIG. 13. The dock leveler 512 is shown positioned at a loading dock having a dock floor 501 and a dock face 502. The dock leveler 512 is adapted to bridge the gap between the loading dock and the bed of a transport vehicle 506 parked in front of the loading dock.

On either side of the dock leveler 512, a bumper assembly 520 is attached to the dock face 502. The bumper assembly 520 includes a bumper bracket 522 and a resilient bumper 524. The bumper assembly 520 protects the dock face 502 from impact and positions the transport vehicle 506 at the desired position relative to the dock leveler 512. A shelf 526 is supported between the bumper assemblies 520.

The dock leveler 512 includes a deck assembly 514 which is pivotally connected to a base assembly 516 at a pivot point 518, allowing the deck assembly 514 to rotate from a generally vertical stored position to one or more lowered operating positions. That is, for example, the deck assembly 514 is movable between a generally vertical stored position (shown in FIG. 15) and a generally horizontal operative position that may be upwardly inclined (shown in FIG. 13) or downwardly declined (shown in FIG. 16) to provide a bridge from the dock floor 501 to a transport vehicle 506 that may be higher or lower than the dock floor 501.

In some embodiments of the invention, the generally horizontal working range includes positions where an end of the deck assembly 514 is about eight inches above horizontal to a position where the end of the deck assembly 514 is about eight inches below horizontal.

The base assembly 516 is mounted to the dock floor 501. As illustrated, the base assembly 516 includes two side plates 528 and an inclined ramp plate 530. Each side plate 528 is mounted to a base plate 532 that is attached to the dock floor 501. Each side plate 528 has a bearing surface 534 (See FIG. 14) to support the pivot shaft 536 of the deck assembly 514. The inclined ramp plate 530 extends from the dock floor 501 to the pivoting end of the deck assembly 514.

The deck assembly 514 includes a deck plate 538 supported by side curbs 540. A pivot shaft 536 is attached at one end of the deck plate 538 and is supported at each end by the bearing surface 534 of each side plate 528. Attached to each side curb 540 is a spring anchor bracket 542.

The counterbalance assembly 510 includes a cam plate 546 and a spring 548. The cam plate 546 is mounted to each base plate 532 outboard of each side plate 528. The cam plate has an anchor hole 550, an upper cam surface 552, and a lower cam surface 554.

Figure 15:
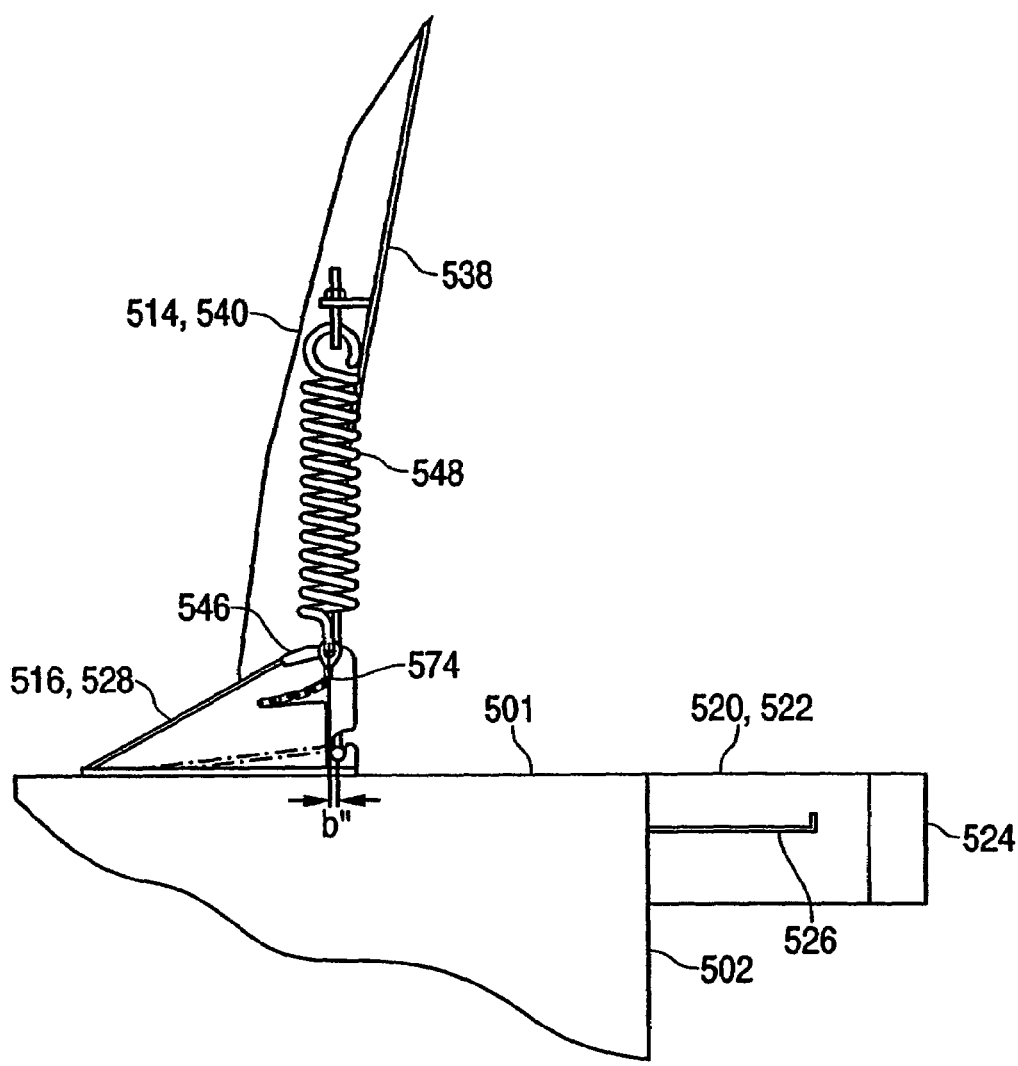
FIG. 15 is a side view illustrating the dock leveler of FIG. 13 in the vertical stored position.
Figure 16:
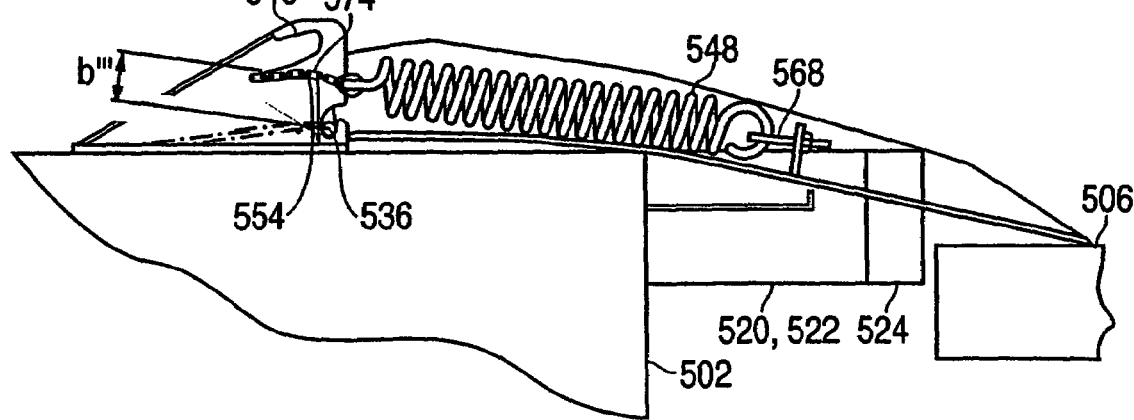
FIG. 16 is a side view of the dock leveler of FIG. 13 in the lowest operative position.

The spring 548 is coupled at one end 556 to the deck assembly 514 and at the other end 558 to the base assembly 516. The spring 548 has a central longitudinal axis 560 defining a line of action (also 560). The spring 548 is coupled to the deck assembly 514 at a first anchor point 562 and to the base assembly 516 at a second anchor point 564. The line defined by the first and second anchor points 562, 564 is the direct line of action. The spring 548 is coupled to the anchor points 562, 564 in such a manner that the position of the line of action 560 can be deflected way from the direct line of action as the deck assembly 514 rotates from the vertically-stored position (shown in FIG. 15) to the one or more lowered operative positions (examples of which are shown in FIGS. 13 and 16). It should be understood that although the second anchor point is shown as located on the base assembly 516, it could also be located on the dock itself.

In the illustrated embodiment, the particular coupling is accomplished by fixedly attaching the upper end 556 of the spring 548 to an adjusting bolt 568 attached to a spring anchor bracket 542. The lower end 558 of the spring 548 is flexibly attached to one end of a chain 572. The other end of the chain 572 is attached to the anchor hole 550 in the cam plate 546. Although the spring 548 is illustrated as being coupled to the base assembly 516 by a chain 572, any flexible anchor tensile member such as a cable or a band would serve the same purpose.

As the deck assembly 514 rotates downward, the direct line of action moves closer to the pivot shaft 536 by virtue of the geometry of the fixed anchor points and pivot point. The interaction of the flexible chain 572 and camming surfaces 552, 554 together operate to deflect the line of action 560 of the spring 548 away from the direct line of action. That is, as the deck assembly 514 rotates, the upper and lower camming surfaces 552, 554 selectively engage the flexible chain 572 shifting the location of the effective anchor point 574.

The term "effective anchor point" is the point of attachment of the end of a spring, which point's location can move as the deck assembly 514 rotates. Thus, for example, in the illustrated embodiment, the "effective anchor point" is the lower end 558 of the spring 548, because, as shown in FIGS. 13–16, the location of the point 574 changes as the deck assembly 514 rotates. By contrast because the upper end 558 of the spring 548 is fixedly attached to the deck assembly, that point of attachment is termed an anchor point rather than "effective" anchor point. It should be noted that the "effective anchor point" may or may not be a true anchor point, that is a point at which the spring 548 is directly coupled to the dock leveler 512. That is if spring end is directly coupled to the dock leveler 512 and that point of attachment is moveable, it can then be an effective anchor point.

As illustrated in FIG. 13, the weight moment of the deck assembly 514 is opposed by the moment of the spring force acting at a distance b' from the pivot shaft 536. The position of the anchor hole 550 (FIG. 14) in the cam plate 546 and the rate of the spring 548 are selected to provide the desired magnitude of the counter balancing moment. As indicated above, as the deck assembly 514 rotates downward, the line of action 560 of the spring 548 will move closer to the pivot shaft 536, and the force of the spring 548 will increase in proportion to the deflection of the spring 548. Preferably, the position of the anchor hole 550 in the cam plate 546 and the rate of the spring 548 are chosen to allow the spring counter balance moment to approximate the weight moment of the deck assembly 514. However, as the deck assembly 514 continues to rotate downward, the distance b' between the line of action of the spring 548 and a parallel line drawn through the pivot shaft 536 decreases faster than the force of the spring 548 increases.

FIG. 16 illustrates the deck assembly 514 rotated to the lowest operative position. The chain 572 is supported by the lower cam surface 554 and causes the line of action of the spring force to be moved to a distance b''' from the pivot shaft 536. The distance b''' is greater than the distance from the pivot shaft 536 to a line connecting the anchor hole 550 and the spring anchor 562. Therefore the spring counter balance moment is increased to the desired value.

Figure 14:
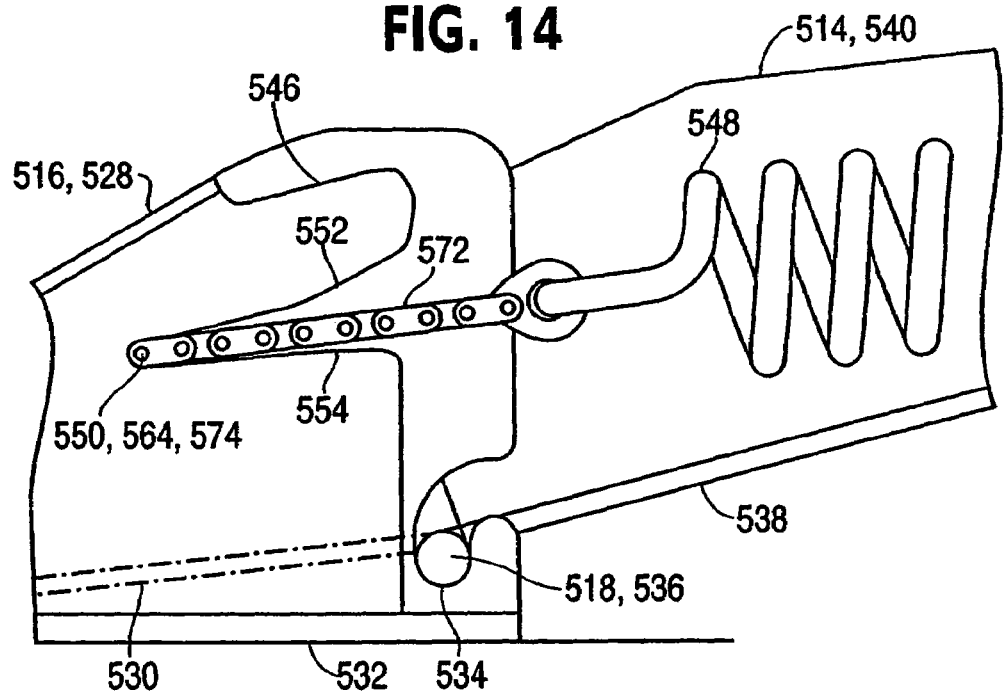
FIG. 14 is an enlarged partial view of the counterbalance mechanism of FIG. 13.

Referring to FIGS. 13 and 14, as the deck assembly 514 rotates upward, the line of force of the spring 548 moves farther above the pivot shaft 536 and the force of the spring 548 decreases in proportion to the deflection of the spring 548. As the deck assembly 514 continues to rotate upward, the distance b' between the line of action 560 of the spring 548 and the pivot shaft 536 increases faster than the force of the spring 548 decreases. In addition the weight moment of the deck assembly 514 decreases as it moves to a more vertical position. FIG. 15 illustrates the deck assembly 514 rotated to the vertical stored position. The chain 572 is supported by the upper cam surface 552 and causes the line of action 560 of the spring force to be moved to a distance b'' from the pivot shaft 536. The distance b'' is less than the distance from the pivot shaft 536 to a line connecting the anchor hole 550 and the spring anchor 562. Therefore the spring counter balance moment is decreased to the desired value.

The use of cam surfaces to modify the spring counter balance moment provides design flexibility. Not only may the spring counter balance moment be matched to the weight moment of the deck assembly 514, but also it may be selected to provide other features. For example, the shape of the lower cam surface 554 may be selected to provide a spring counterbalance moment that is less than the weight moment when the deck assembly 514 is in the operative position so that it will rest securely on the truck bed. The shape of the upper cam surface 552 may be selected to provide a spring counter balance moment that is greater than the weight moment when the deck assembly 514 is above the operative position so that it will rise easily to the stored position. Also the shape of the upper portion of the upper cam surface 552 may be selected so that the spring counter balance moment is almost equal to the weight moment when the deck assembly 514 is in the stored position. This will allow the operator to easily move the deck assembly 514 to or from the stored position.

Figure 17:
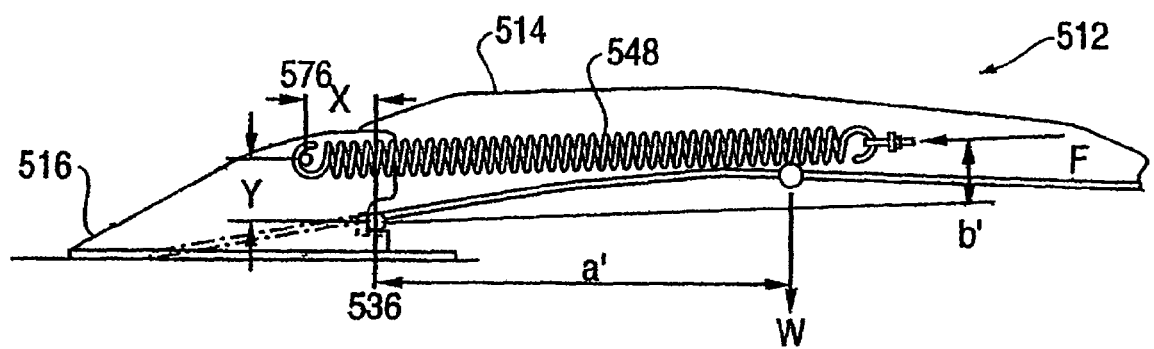
FIG. 17 illustrates a preliminary configuration of a tension spring counter balance mechanism with the dock leveler in a lowered working position.

Without being bound by theory, following is a more technical description of the present invention relative to a prior art spring counter balance mechanism. FIG. 17 illustrates a preliminary configuration of a tension spring counter balance mechanism with one end of the spring 548 connected to a deck assembly 514 and the other end to base assembly 516 and with the dock leveler 512 in a lowered working position. The weight of the dock leveler 512 is illustrated by arrow W acting downward through the center of gravity ("CG") of the dock leveler 512. The dimension a' indicates the horizontal distance from the CG to the pivot shaft 536 of the dock leveler 512. The resulting rotational moment is the product of the weight W multiplied by the distance a'. The rotational moment of the weight of the dock leveler 512 varies from a maximum when the CG is in the horizontal plane of the pivot shaft 536 to zero when the CG is in the vertical plane of the pivot shaft 536. The magnitude varies as the cosine of the angle of rotation of the CG measured from the horizontal plane.

Still referring to FIG. 17, the spring 548 is anchored to the base assembly 516 by a pin 576 located relative to the pivot shaft 536 at horizontal and vertical dimensions of X and Y respectively. The force of the spring 548 is illustrated by the arrow F acting through the center of the spring 548. The dimension b' indicates the perpendicular distance from the pivot shaft 536 to the line of force of the spring 548. The rotational moment of the spring 548 acting on the dock leveler 512 is the product of the force F multiplied by the distance b'.

Figure 18:
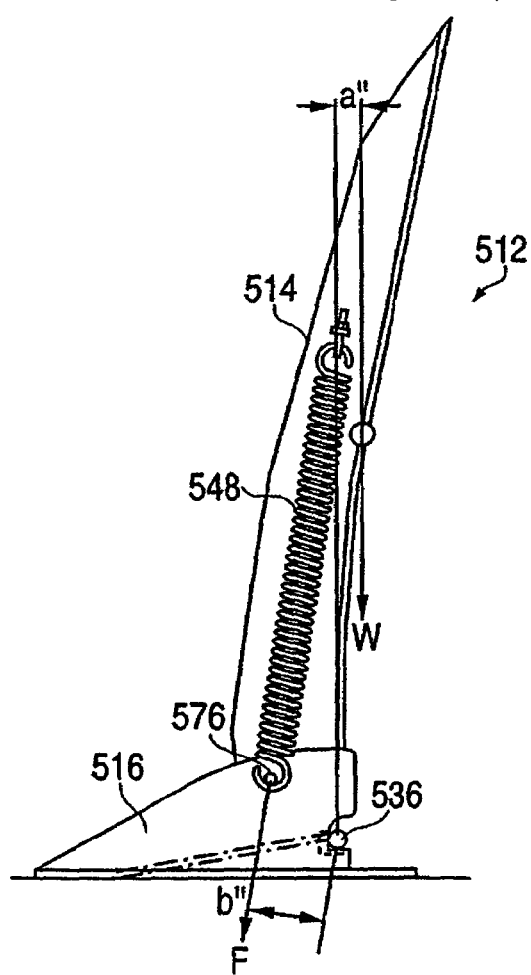
FIG. 18 illustrates the preliminary configuration of a tension spring counter balance mechanism of FIG. 17 with the dock leveler in the stored position.

FIG. 18 illustrates the preliminary configuration of the spring counter balance mechanism with the dock leveler 512 in a vertical stored position. As illustrated, the CG of the dock leveler 512 is almost directly over the pivot shaft 536 and the horizontal distance a'' from the CG to the pivot shaft 536 is very small. However, the distance b'' from the pivot shaft 536 to the line of action of the spring force is still large and even a small spring force will produce a significant upwardly biased spring moment.

Although the magnitude of the spring moment can be varied by changing the spring rate, the spring tension, or the position of the anchor pin 576 relative to the pivot shaft 536, the nature of the geometry is that none of the variables can be configured to cause the spring counter balance moment to match the rotational moment of the weight of the dock leveler 512. Altering the parameters may change the relative shape of the spring moment curve relative to the weight moment curve. However, selection of parameters provides specific values only at two positions relative to the weight moment curve.

FIG. 19 is a graphical illustration of the relative magnitude of the weight and spring rotational moments of the preliminary configuration of the spring counter balance mechanism as the center of gravity is rotated from a vertical to a horizontal position. As previously stated, altering the parameters may change the relative shape of the spring moment curve relative to the weight moment curve. However the spring moment curve is representative of a preferable solution where the dock leveler 512 is balanced to the preferable value at the horizontal position. The dock leveler 512 is slightly downwardly biased so that it remains in contact with a transport vehicle as it moves up or down with deflection of the suspension.

As shown in FIG. 19, the spring counter balance moment decreases as the dock leveler 512 rotates below horizontal.

Thus the dock leveler 512 becomes more difficult to lift as it rotates to a lower position. If the spring parameters are selected to approximate the weight balance curve, another characteristic is that the dock leveler 512 become more upwardly biased as the dock leveler 512 rotates to the stored vertical position. This makes the dock leveler 512 difficult to lower from the stored position. The third characteristic is that after the operator has overcome the upward bias at the stored position, the dock leveler 512 will fall all the way down until it rests on the transport vehicle.

The lower curve illustrated in FIG. 19 is the difference between the clockwise weight moment and the counterclockwise spring moment. Values above the zero line represent positions of upward bias and those below the zero line represent positions of downward bias. Thus it is shown that the operator must push the dock leveler 512 away from the stored position and then it will fall all the way to the bed of the transport vehicle. Conversely, to store the dock leveler 512, the operator must lift it almost all the way to the stored vertical position.

FIG. 20 is a graphical illustration of the relative magnitude of the weight and spring rotational moments of an embodiment according to the present invention. As illustrated in FIG. 13, the upward spring counter balance moment is the product of the spring force F and the distance b' from the pivot shaft 536 to the line of force 560 of the spring 548. The spring parameters are preferably selected to provide the desired counter balance force.

FIG. 15 illustrates an embodiment of the present invention with the dock leveler 512 rotated upward to the vertical stored position. The chain 572 contacts the cam surface 552 and is thus deflected away from a direct line between the anchor hole 550 and the spring anchor bracket 542 on the dock leveler 512. Thus the distance b" and therefore the spring moment are reduced relative to the prior art design. Similarly, as illustrated in FIG. 16, when the dock leveler 512 is rotated downward below the horizontal position, the chain 572 contacts the cam surface 554 and is thus deflected above a direct line between the anchor hole 550 and the spring anchor bracket 542 on the dock leveler 512. Thus the distance b'" and therefore the spring moment are increased relative to the preliminary design. A person of ordinary skill will appreciate from the teachings herein that the shape of the cam surfaces 550, 552 can be configured to produce almost any desired value of spring counter balance moment for various positions of rotation of the dock leveler 512.

A benefit of an embodiment according to this invention is illustrated by the graph in FIG. 20. As illustrated by the right side of the graph, as the dock leveler 512 rotates below the horizontal position, the spring moment remains a uniform amount below the weight moment. This can ensure that the dock leveler 512 remain in contact with the bed of the transport vehicle, yet is not more difficult to raise from a lower position.

As illustrated by the left side of the graph, when the dock leveler 512 is rotated to the vertical stored position, the spring moment remains slightly lower than the weight moment. This has a benefit for the operator while raising and lowering the dock leveler 512. The spring parameters and the shape of the upper cam surface 552 can be selected so that when the dock leveler 512 is released from the stored vertical position, it will accelerate downward until it reaches the upward biased region. It may then decelerate and stop before it reaches the horizontal working position. The operator can then step on to the dock leveler 512 and gently force it down onto the bed of the transport vehicle.

There is also a benefit when raising the dock leveler 512 to the stored vertical position. As described above, the weight moment preferably does not increase as the dock leveler rotates below the horizontal position, so that it is easer to lift. When the operator lifts the dock leveler 512 above the working position, the spring moment increases beyond the weight moment so that the dock leveler 512 starts to accelerate upward and with very little effort the operator will be able to lift it up through the slightly downward biased region to the stored vertical position.

As in FIG. 19, the lower curve illustrated in FIG. 20 is the difference between the clockwise weight moment and the counterclockwise spring moment. Values above the zero line represent positions of upward bias and those below the zero line represent positions of downward bias. Thus it is shown that when the operator releases the dock leveler 512 from the stored position, it initially falls toward the bed of the transport vehicle and then decelerates when it reaches the upwardly biased region. When the operator forces the dock leveler beyond the upwardly biased region it falls on to the bed of the transport vehicle. Conversely to store the dock leveler 512, the operator is required only to lift it to the upwardly biased region and then with the assistance of the upward bias force easily move the dock leveler 512 through the slightly downward biased region to the stored vertical position.

Additional embodiments of the present invention are shown in FIGS. 21–38 and are described below.

Another embodiment of the present invention is shown in FIG. 21 and FIG. 22. The dock leveler 600 is shown positioned at a loading dock 602 having a dock floor 604 and a dock face 606. The dock leveler 600 bridges the gap between the loading dock 602 and the bed 608 of a transport vehicle 610 parked in front of the loading dock 602.

On either side of the dock leveler 600, a bumper assembly 612 is attached to the dock face 606. The bumper assembly 612 includes a bumper bracket 614 and a resilient bumper 616. The bumper assembly 612 protects the dock face 606 from impact and positions the transport vehicle 610 at the desired position relative to the dock leveler 600.

A shelf 618 (sometimes referred to as a platform or barrier) is supported between the bumper assemblies 612. The shelf or barrier 618 is at least strong enough to support the weight of dock workers. Optionally the shelf 618 is made of plate steel. The shelf 618 in some embodiments of the invention has a skid resistant surface. The skid resistant surface may be a raised cross check pattern commonly applied to plate metal or any other suitable skid resistant surface. The shelf 618 in some embodiments of the invention includes a flange (sometimes referred to as a lip) 620. Optionally, the flange 620 of the shelf 618 may extend above the top surface of the shelf 618. (See reference numeral 27 in FIG. 3). Optionally, the barrier 618 may not be a shelf, but a net, cable system or some other suitable barrier 618 that will reduce the likelihood of objects falling down between the bumper assemblies 612.

The shelf 618 provides a platform for dock workers to stand and access the bottom of the dock leveler 600. As shown in FIGS. 21 and 22 the shelf 618 falls with in the footprint made by the deck assembly 622 of the dock leveler 600 when the deck assembly 622 is in a substantially horizontal position. According to some embodiments of the invention, the bumper assemblies 612 project farther from the dock face 606 than the shelf 612. The shelf 612 can attach to the bumper assemblies 612, to the dock floor 604, or dock face 606, or any other suitable mounting surface.

The dock leveler 600 includes a base assembly 624, a deck assembly 622 and a lip 626. As illustrated, the base assembly 624 is mounted to the dock floor 604 with bolts 628. The base assembly 624 includes two side housings 630 and an inclined ramp plate 632 sometimes called a pre-ramp. Each side housing 630 is mounted to a base plate 634 that is attached to the dock floor 604 by bolts 628. A cam plate 636 and a bearing 638 are mounted to each base plate 640 within each side housing 630.

Figure 23:
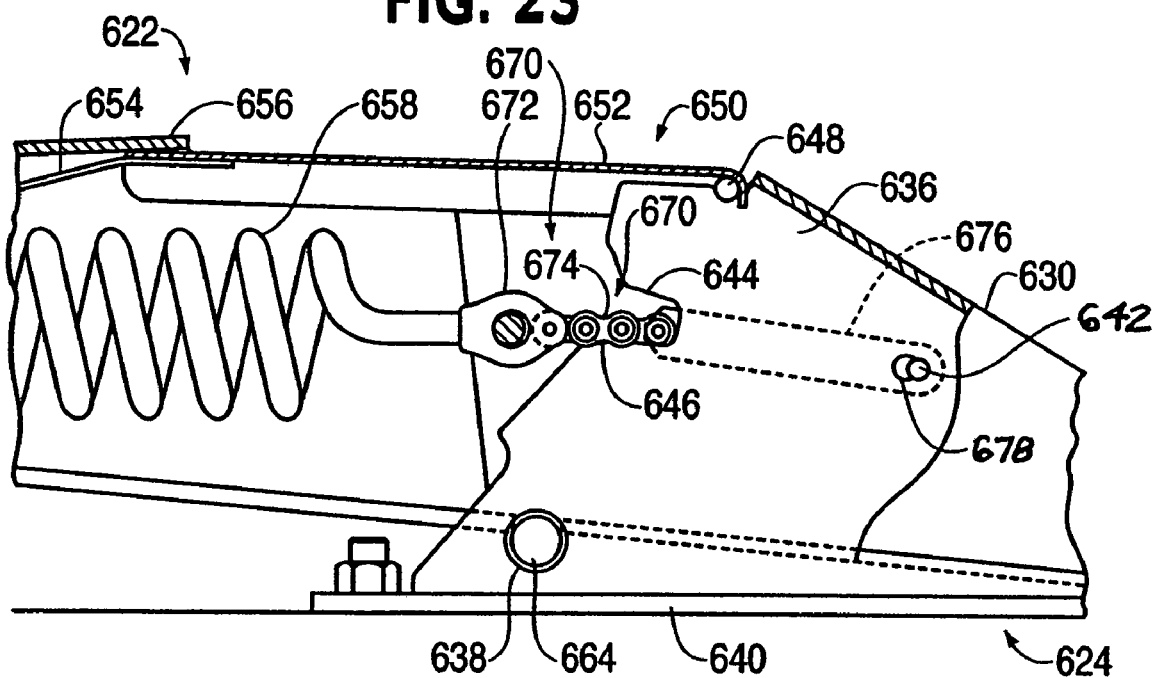
FIG. 23 is an enlarged partial view of the counterbalance mechanism of FIG. 22.
Figure 24:
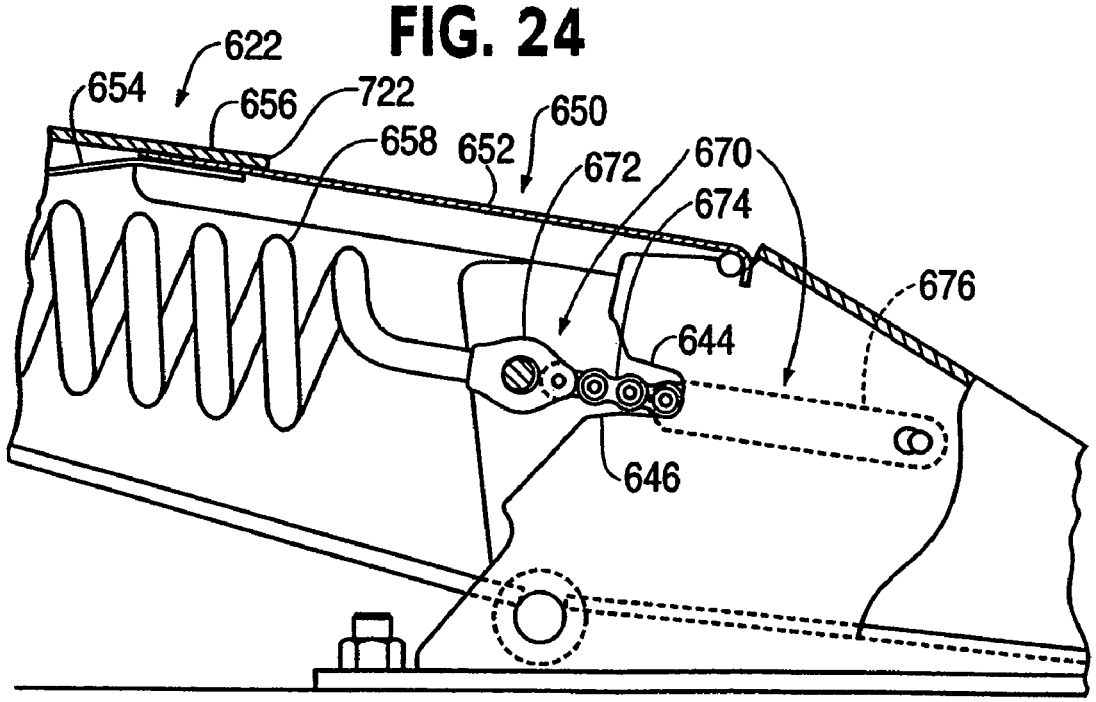
FIG. 24 is an enlarged partial view of the counterbalance mechanism illustrating the dock leveler of FIG. 22 in a position slightly above the upper end of the designed operating range.

As shown in more detail in FIGS. 23 and 24, the cam plate 636 has an anchor hole 642, an upper cam surface 644, and a lower cam surface 646. A pivot shaft 648 is attached to each side housing 630. As shown in FIGS. 21 and 22, a cover assembly 650 has a cover 652 and a spring arm 654. One end of the cover 652 is mounted to pivot about the pivot shaft 648 attached to side housing 630. The spring arm 654 is a leaf spring that holds the cover 652 to the top of the side curb 656. The spring arm 654 is welded to the top of the cover 652. As shown in FIG. 22, the end of the spring arm 654 opposite the end attached to the cover 652 contacts and urges against the coil spring 658.

The deck assembly 622 includes a deck plate 660 supported by side curbs 656. Attached to each side curb 656 is a spring anchor bracket 662. A pivot shaft 664 is attached at one end of the deck plate 660 and each end of the shaft 664 is supported by a bearing 638 on each side housing 630.

At the outer end of the deck assembly 622 is a lip 626 that pivots on a shaft 666. The lip 626 is normally extended to rest on the bed 608 of a truck 610 as shown in FIG. 22 but may be retracted to allow "end loading." End loading is a condition where cargo is loaded clear to the back of the truck 610 and would interfere with the lip 626 resting on the vehicle bed 608.

The deck assembly 622 rotates about the pivot shaft 664 from a generally vertical stored position to one or more lowered operating positions. That is, the deck assembly 622 is movable between a generally vertical stored position (shown in FIG. 32) and a generally horizontal operative position (shown in FIG. 22) that may be upwardly inclined or downwardly declined from the generally horizontal position to provide a bridge from the dock floor 604 to a transport vehicle 610 that may be higher or lower than the dock floor 604. The somewhat horizontal positions a dock leveler achieves to provide a bridge between the loading dock floor 604 and the vehicle bed 608, whether the vehicle bed 608 is at, above, or below the level of the dock floor 604 is referred to in this document as the working range.

The weight of the deck assembly 622 and lip 626 is supported by at least one counterbalance spring 658. The spring 658 is coupled at one end to an adjusting bolt 668 attached to the spring anchor bracket 662 on the deck assembly 622 and at the other end to a flexible anchor member 670 comprising an anchor lug 672, and pivoting links 674 and 676 (shown in FIGS. 23 and 24). The ends of the links 674 are attached to the cam plate 636 by the pin 678. The configuration of the spring counter balance components is selected so that the deck assembly 622 is downward biased throughout the generally horizontal working range. Having the deck assembly 622 downwardly biased while in the working range provides the advantage of keeping the lip 626 in contact with the vehicle 610 bed 608 as the vehicle 610 and bed 608 move up and down due to the jostling of loading and unloading.

The deck assembly 622 is upwardly biased at positions above the working range to assist in raising the deck assembly 622 toward the vertical stored position. The deck assembly 622 is then again downwardly biased as it approaches the vertical stored position, changing the bias back to downwardly bias as the deck assembly 622 approaches the vertical stored position and assists in lowering the deck assembly 622.

Factors in achieving the desired operating characteristics are the rate of the spring 658, the location of the anchor hole 642 and the shape of the cam surfaces 644 and 646. The cam surfaces 644 and 646 deflect the flexible anchor member 670 to vary the distance from the pivot shaft 664 to the line of action of the spring 658. Moving the line of action of the spring 658 away from the pivot shaft 664 increases the counter balance moment and moving the line of action of the spring 658 toward the pivot shaft 664 decreases the counter balance moment.

FIG. 23 illustrates the deck assembly 622 in a generally horizontal operative position where the flexible spring anchor member 670 is in contact with the lower cam surface 646. FIG. 24 illustrates the deck assembly 622 in a relatively higher position slightly above the normal operating range of the dock leveler 600. The flexible anchor member 670 has moved away from the lower cam surface 646 and the line of action of the spring 658 has moved farther away from the pivot shaft 664. If the deck assembly 622 rotates to a higher position, the line of action of the spring 658 will move farther away from the pivot shaft 664 and the counter balance moment will increase to change the deck assembly 622 from downwardly biased to upwardly biased and the dock leveler 600 will raise above the bed 608 of the truck 610.

Figure 25:
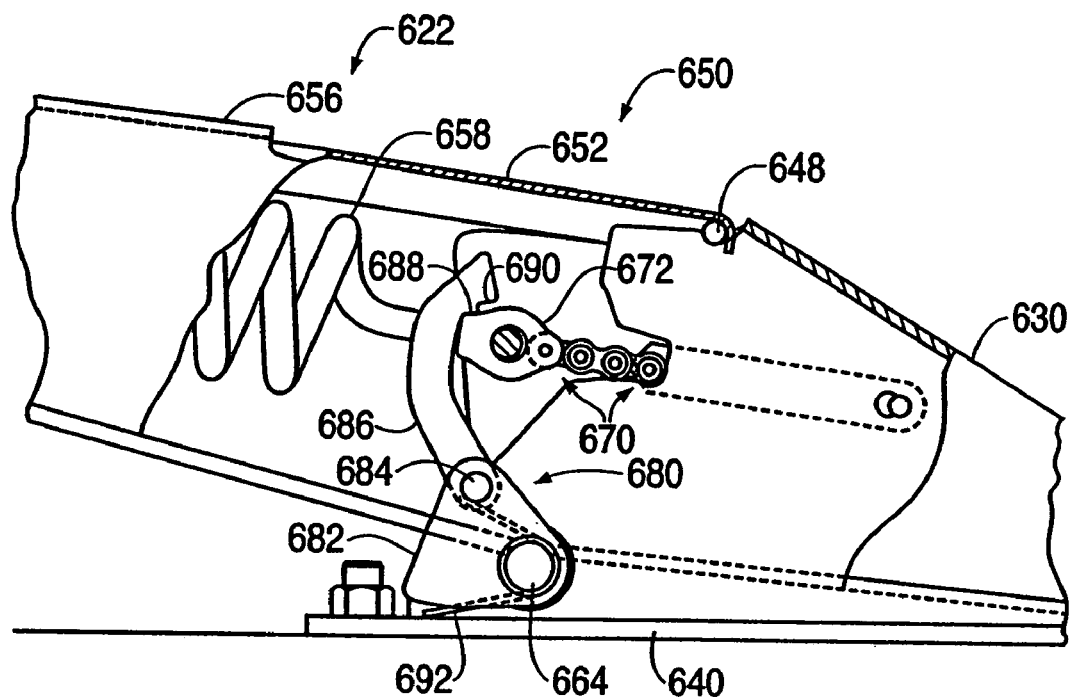
FIG. 25 is an enlarged partial view of the counterbalance mechanism illustrating the dock leveler of FIG. 22 in a position slightly above the upper end of the designed operating range with the hold down device engaged.

FIG. 25 illustrates the dock leveler of FIG. 24 with the addition of a hold down assembly 680. The hold down assembly has a bracket 682, a pin 684 and an arm 686 having locking surfaces 688 and 690. The bracket 682 pivots on the pivot shaft 664 and is biased in a clockwise direction by a spring 692. The locking surface 688 has engaged the top surface of the lug 672, preventing the flexible anchor member 670 and the end of the spring 658 from moving farther away from the pivot shaft 664. Therefore, as the deck assembly 622 rotates upward, the counter balance moment will not increase. Thus the deck assembly 622 will remain downwardly biased and the dock leveler 600 will remain in contact with the bed 608 of the truck 610, even if the bed 608 of the vehicle 610 moves up and down due to jostling associated with loading and unloading the dock leveler 600.

Figure 26:
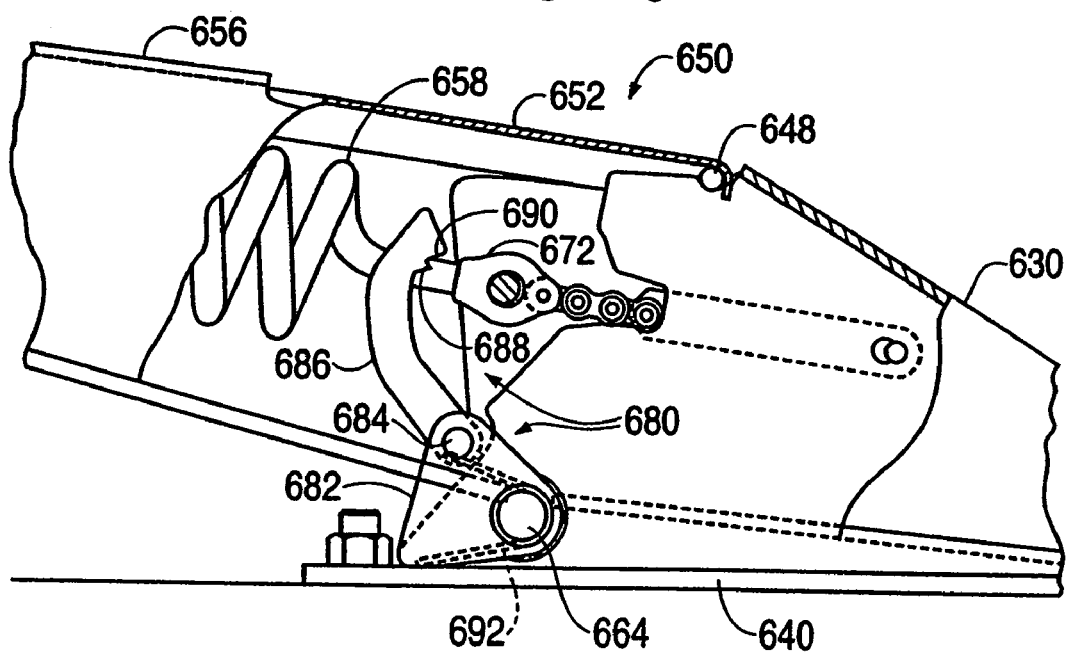
FIG. 26 is an enlarged partial view of the counterbalance mechanism illustrating the dock leveler of FIG. 22 with the hold down device disengaged.

FIG. 26 illustrates the dock leveler with the hold down assembly 680 rotated counterclockwise to a position where the locking surfaces 688 and 690 are disengaged from the lug 672 to allow the deck assembly 622 to rotate clockwise to toward the vertically stored position.

Figure 27:
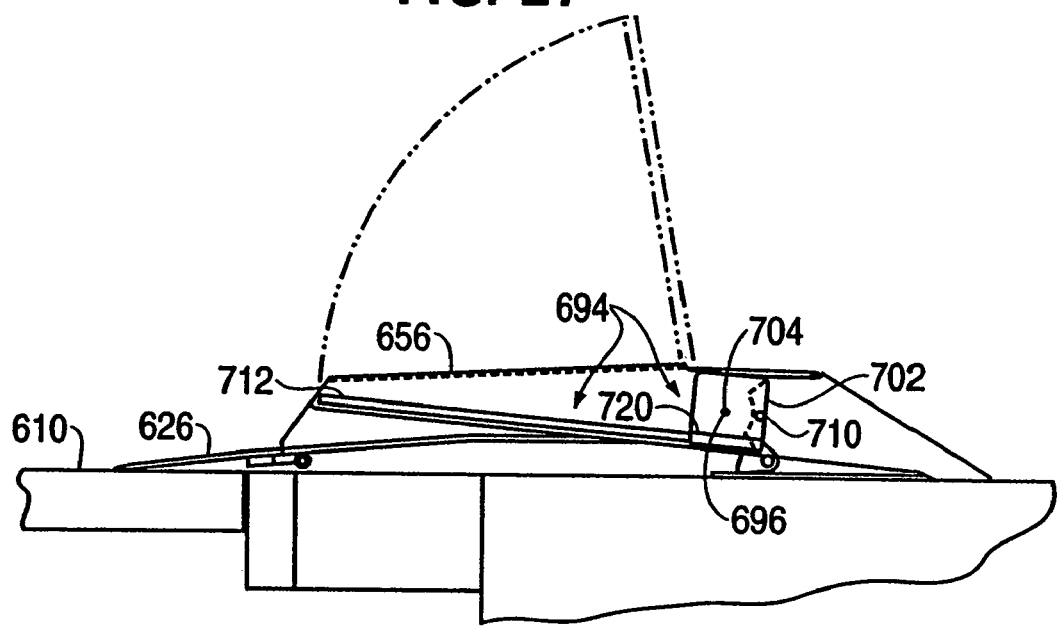
FIG. 27 is a side view of the dock leveler of FIG. 22 illustrating the lifting lever in the stored lowered position and the position of the lifting lever in the raised operative position.
Figure 28:
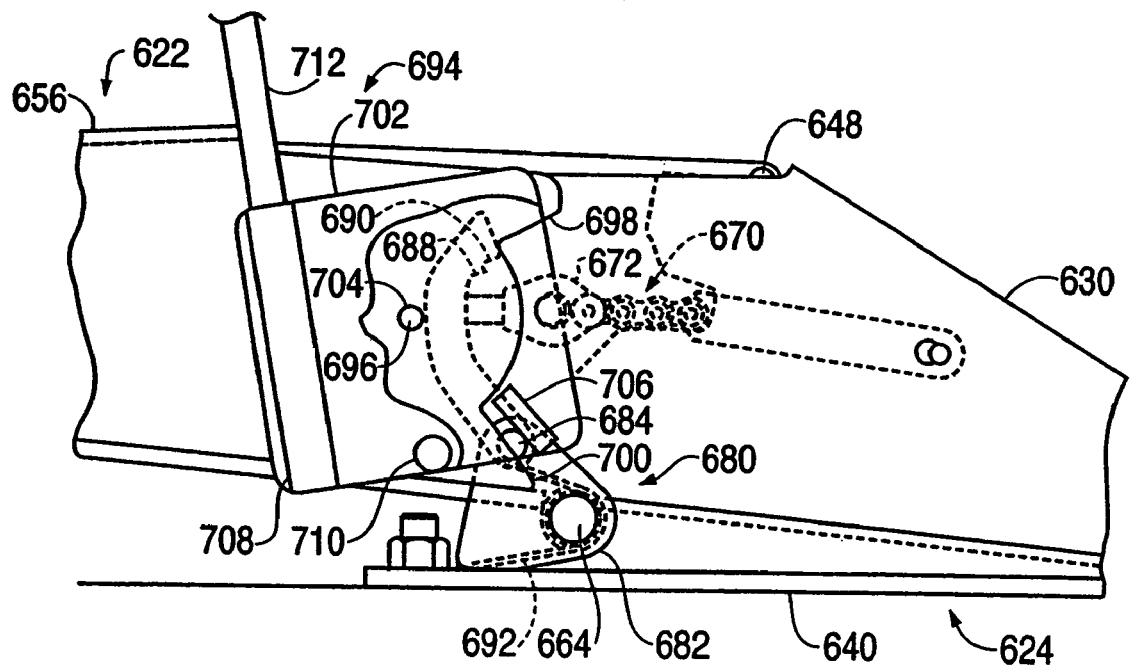
FIG. 28 is an enlarged partial view of the dock leveler of FIG. 22 illustrating the lifting handle rotating the hold down device to a disengaged position and providing a torque enhancement relative to the rotation of the dock leveler.

FIG. 27 illustrates the dock leveler 600 with a lever assembly 694 to provide the operator with a means of rotating the deck assembly 622 from the generally horizontal working range to a generally vertical stored position. As shown in FIG. 28, a pin 696 is mounted to the side curb 656 of the deck assembly 622. The rear edge of the side curb 656 has a contoured notch that provides stop surfaces 698 and 700. The lever assembly 694 has a plate 702 with a hole 704 that fits over the pin 696 on the side curb 656 allowing the plate 702 to rotate about the pin 696. A lug 706, a tube 708 and a bar 710 are attached to the plate 702. A control bar 712 is inserted in the tube 708. When the deck assembly 622 is in the generally horizontal working position as shown in FIG. 27, the lever assembly 694 rotates counterclockwise to a stored position below the top of the side curb 656 as shown in solid lines. The lug 706 contacts the stop surface 698 to prevent the lever 704 from falling below the side of the curb 656.

To operate the dock leveler 600, the operator may manually lift the control bar 712 to an operative position by bending down and grabbing an end of the control bar 712, or may step on the bar 710 (also shown in perspective view in FIG. 21) to rotate the plate 702 and thus the control bar 712 to an operative position and then grab hold of the control bar 712. The rotation of the control bar 712 by using step bar 710 saves the dock worker from having to bend down to nearly ground level to grab the control bar 712. The operative position is shown in phantom lines in FIG. 27. When the control bar 712 is raised to the operative position, the lever assembly 694 provides several functions. First the lug 706 contacts the pin 684 on the hold down assembly 680, causing the hold down assembly 680 to rotate counterclockwise and move the locking surfaces 688 and 690 out of engagement with the top of the lug 672. Once the locking surfaces 688 and 690 are out of engagement, the flexible anchor member 670 is free to rise as the deck assembly 622 rotates to the stored vertical position. As the hold down assembly 680 rotates counterclockwise the front end of the bracket 682 contacts the base plate 640, causing the pin 684 to have a fixed relationship to the base assembly 624.

As the operator continues to pull on the end of the control bar 712, the lug 706 bears against the pin 684 and creates a reaction force on the pin 696 attached to the deck assembly 622 and urges the deck assembly 622 to rotate clockwise toward the stored vertical position. Because the distance from the pin 696 to the pin 684 is less than the distance from the pin 696 to the pivot shaft 664, the reaction force on the pin 696 applies a rotational moment to the deck assembly 622 that is greater than the rotational moment applied by the operator to the lever assembly 694. Thus the lever assembly 694 has an increased mechanical advantage over the deck assembly 622, and a force exerted by the operator on the end of the control bar 712 will cause a greater lifting moment on the deck assembly 622 than a lever of the same length attached directly to the deck assembly 622. This mechanical advantage reduces the force required by the operator to lift the deck assembly 622 from the downwardly biased working range. Because of the increased mechanical advantage, the lever assembly 694 will rotate faster than the deck assembly 622.

Figure 29:
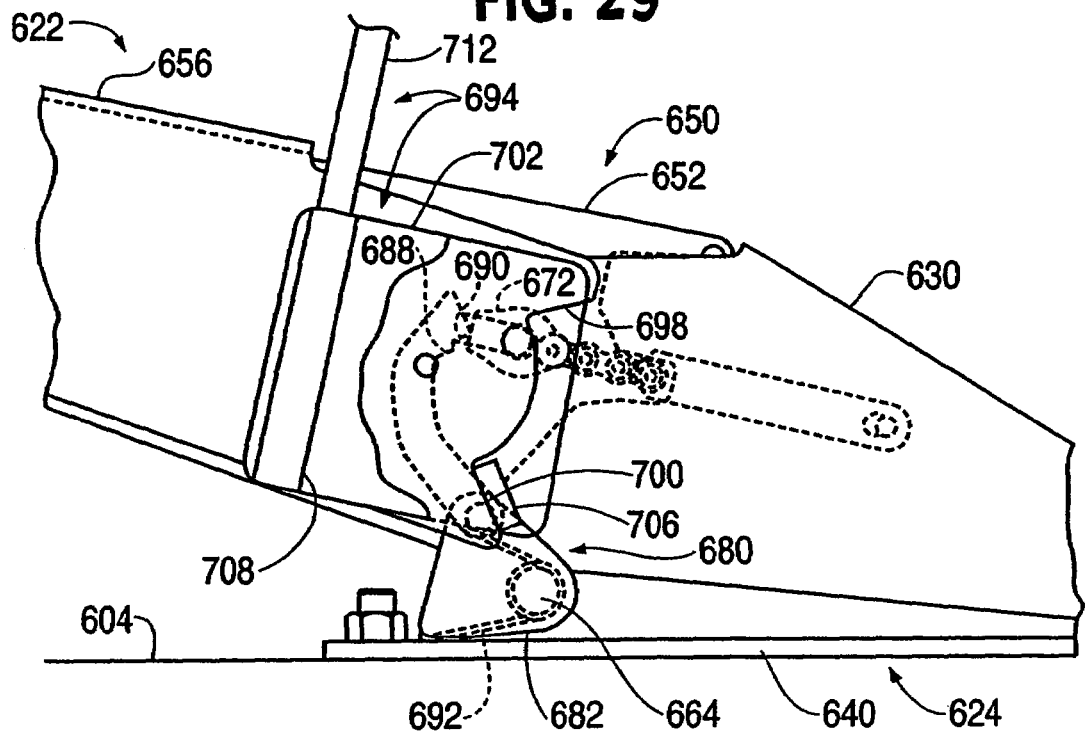
FIG. 29 is an enlarged partial view of the dock leveler of FIG. 22 illustrating the lifting handle rotated to a position that provides a direct torque connection to the dock leveler.

FIG. 29 shows the deck assembly 622 rotated above the working range and the lever assembly 694 has rotated clockwise until the lug 706 has contacted the stop surface 700. The lever assembly 694 is now effectively coupled directly to the deck assembly 622. Although the lifting moment is reduced, the deck 622 is now in the upwardly biased range and less force is required by the operator to raise the deck assembly 622.

By limiting the increased mechanical advantage to the downwardly biased working range, the operator moves the lever 694 a shorter distance than if the increased mechanical advantage had been maintained throughout the travel. As shown in FIG. 29 the hold down assembly 680 is no longer held in the maximum counterclockwise position, but the top of the lug 672 has moved above the locking surfaces 688 and 690 and the hold down assembly 680 cannot impede the upward rotation of the deck assembly 622.

Figure 30:
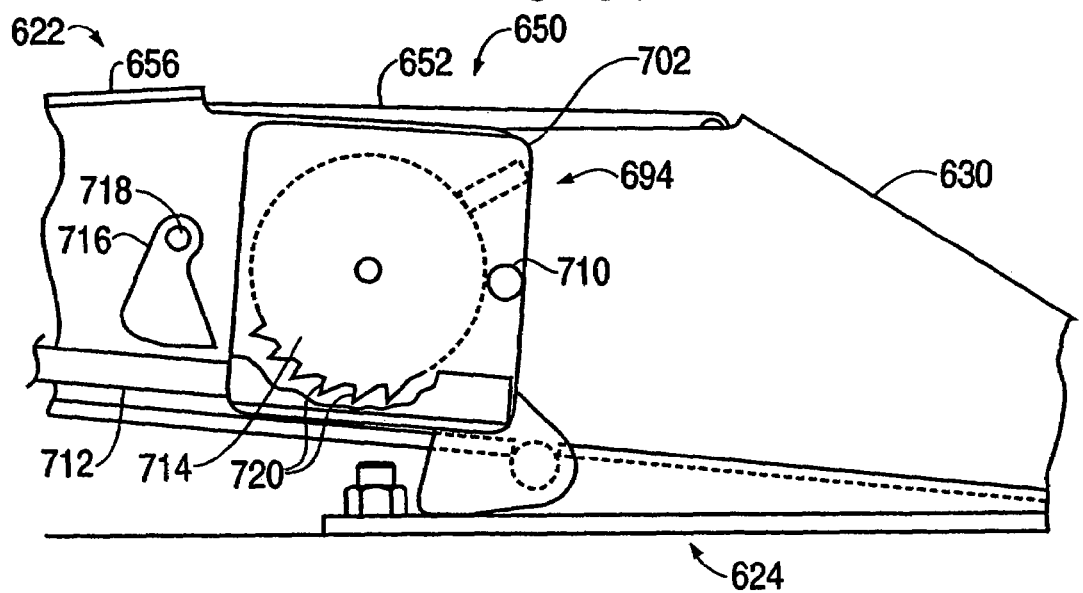
FIG. 30 is an enlarged partial view of the dock leveler of FIG. 22 illustrating the lifting lever with a ratchet and a pawl disengaged from the ratchet.
Figure 32:
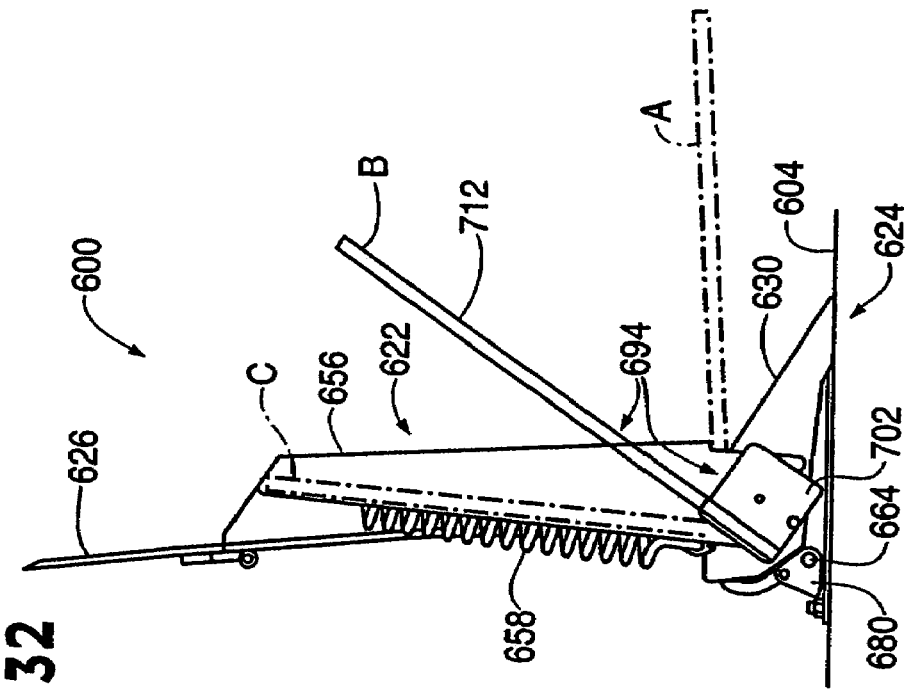
FIG. 32 is a side view of the dock leveler of FIG. 21 in the stored vertical position, illustrating three positions of the lifting lever.
Figure 31:
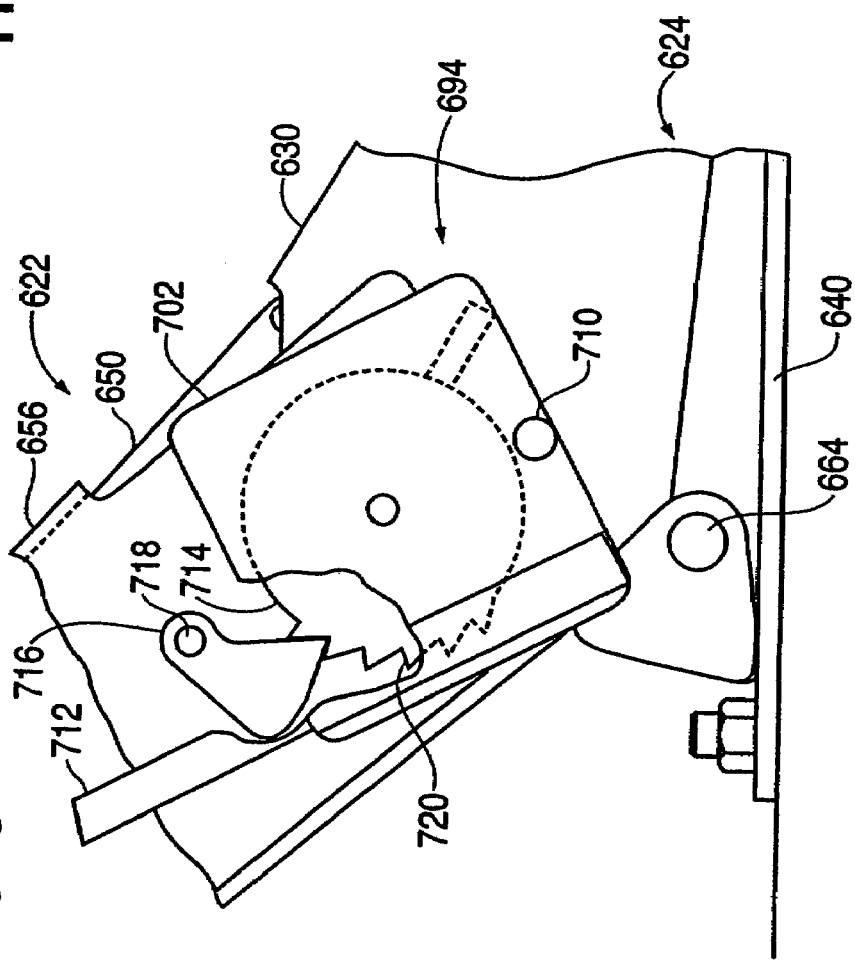
FIG. 31 is an enlarged partial view of the dock leveler of FIG. 22 rotated to a position where the pawl engages a tooth on the ratchet.

In some embodiments of the present invention, the lever assembly 694 includes a ratchet 714 and pawl 716, as shown in FIGS. 30–31, to allow the lever assembly 694 to engage the deck assembly 622 at intermediate angles when the deck assembly 622 is in a position above the downwardly biased working range. The side curb 656 of the deck assembly 622 has a pin 718. A pawl 716 pivots on the pin 718 and is configured so that it is maintained by gravity in a pendant position. (The position shown in FIG. 30). A ratchet plate 714 with teeth 720 is attached to the plate 702 of the lever assembly 694. When the deck assembly 622 is lowered to the working range, the pendant position of the pawl 716 is out of engagement with the ratchet plate 714 as shown in FIG. 30.

When the operator wishes to raise the deck assembly 622 to the stored position the pawl 716 will not prevent the lever assembly 694 from rotating fully clockwise. This ensures that the lug 706 will contact the pin 684 on the hold down assembly 680, causing the hold down assembly to disengage from the lug 672. (See FIG. 28). The arrangement will also provide an increase in mechanical advantage of the lever assembly 694 over the deck assembly 622.

When the deck assembly 622 has rotated above the working range, the pawl 716 engages the ratchet plate 714 as shown in FIG. 31. When rotating the deck assembly 622 to the vertical stored position, the operator is not required to pull the control bar 712 to a position shown as "A" in FIG. 32. Instead the operator can push the control bar 712 forward to allow the pawl 716 to engage a different tooth 720 on the ratchet plate 714, and then pull the control bar 712 back to engage the deck assembly 622 at a more convenient position shown as "B" in FIG. 32. Also, when the deck assembly 622 is fully raised, the operator can push the control bar 712 fully forward to allow the pawl 716 to engage the last tooth 720 on the ratchet plate 714. This will hold the lever assembly 694 in a stored position shown as "C" in FIG. 32 so that it does not fall into the path of people or vehicles traveling past the dock leveler 600.

Figure 34:
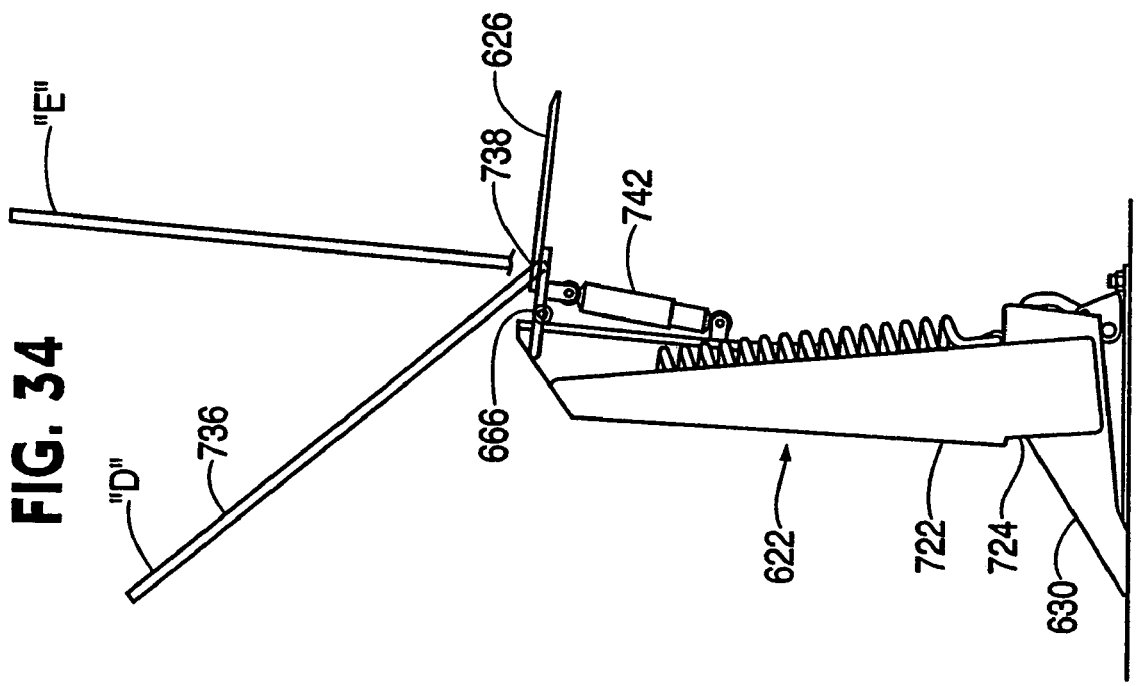
FIG. 34 is a side view of the dock leveler of FIG. 21 in the stored vertical position, illustrating the lip control handle with the lip retracted.
Figure 33:
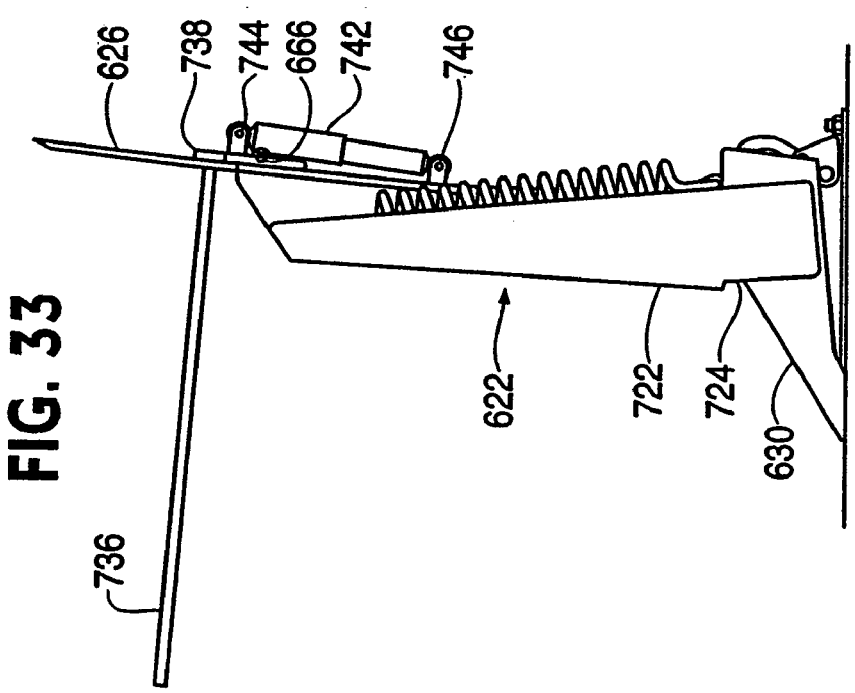
FIG. 33 is a side view of the dock leveler of FIG. 21 in the stored vertical position, illustrating the lip control handle with the lip extended.

As shown in FIG. 33 and FIG. 34, the top surface 722 of the side curb 656 of the deck assembly 622 ends short of the side surface 724 of the side curb 656 to avoid interference with the side housing 630. As shown in FIG. 21 and FIG. 22, when the deck assembly 622 is lowered to a relatively horizontal working position, there is a significant distance between the end of the top surface 722 of the side curb 656 and the side housing 630. As shown in FIG. 22, a cover assembly 650 has a cover 652 and a spring arm 654. One end of the cover 652 is mounted on the pivot shaft 648 attached to side housing 630. The spring arm 654 bears against the spring 658 and urges the other end of the cover 652 against the under side of the top surface 722 of the side curb 656. As shown in FIG. 23 and FIG. 24, the distance between the end of the top surface 722 of the side curb 656 and the side housing 630 varies as the deck assembly 622 rotates. Thus the end of the cover 652 will slide along the under side of the top surface 722 of the side curb 656 and cover the opening between the side curb 656 and the side housing 630.

FIG. 33 illustrates the dock leveler 600 with the deck assembly 622 in the stored vertical position with the lip 626 extended. As illustrated in FIGS. 35–36 a latch bar 726 is attached to the lip 626.

In some applications it may be desirable to latch the lip 626 in the extended position. In order to accomplish this, a lip latch assembly 728 (see FIG. 35) is provided on some embodiments of the invention. The latch assembly 728 has a lip latch 730 and a thrust bar 732. The lip latch 730 is mounted on the spring anchor bracket 662 of the deck assembly 622 and secured by the nut 734 on the adjusting bolt 668. The tension of the spring 658 clamps the lip latch 730 to the spring anchor bracket 662. The end of the lip latch 730 engages the end of the latch bar 726 to maintain the lip 626 in the extended position. The thrust bar 732 engages the edge of the spring anchor bracket 662 to resist the force of the latch bar 726.

FIG. 36 illustrates the lip 626 rotated slightly toward the retracted position. The end of the latch bar 726 has been forced past the end of the lip latch 730, causing the lip latch assembly 728 to rotate about the edge of the spring anchor bracket 662 and causing the spring 658 to extend. The dimensions of the lip latch assembly 728 and the spring anchor bracket 662 are selected so that the force of the spring 658 will exert sufficient force on the lip latch assembly 728 to maintain the lip 628 in an extended position when the deck assembly 622 is in the generally horizontal working range as illustrated in FIG. 22.

Additional force acting in the direction toward the dock face 606 and parallel to a surface formed by the lip 626 in the extended position and the deck plate on the end of the lip 626 will cause the latch bar 726 to deflect the end of the lip latch 730 or deck 660 and allow the lip 626 to fall to the retracted position. This "yieldable" lip feature prevents damage if a truck 610 should back into the lip 626 while the dock leveler 600 is left in the lowered position with the lip 626 extended. As previously described, the deflection and force of the spring 658 increase when the deck assembly 622 is rotated to the generally horizontal working range and decrease when the deck assembly 622 is rotated to the generally vertical stored position. When the deck assembly 622 is in the stored vertical position, much less force is required to rotate the lip 626 from the extended, latched position and to force the latch bar 726 past the end of the lip latch 730. In addition to providing ease of use for the operator, using the spring 658 for the lip latch 730 also reduces cost by eliminating the requirement for an additional lip latch spring.

Figure 38:
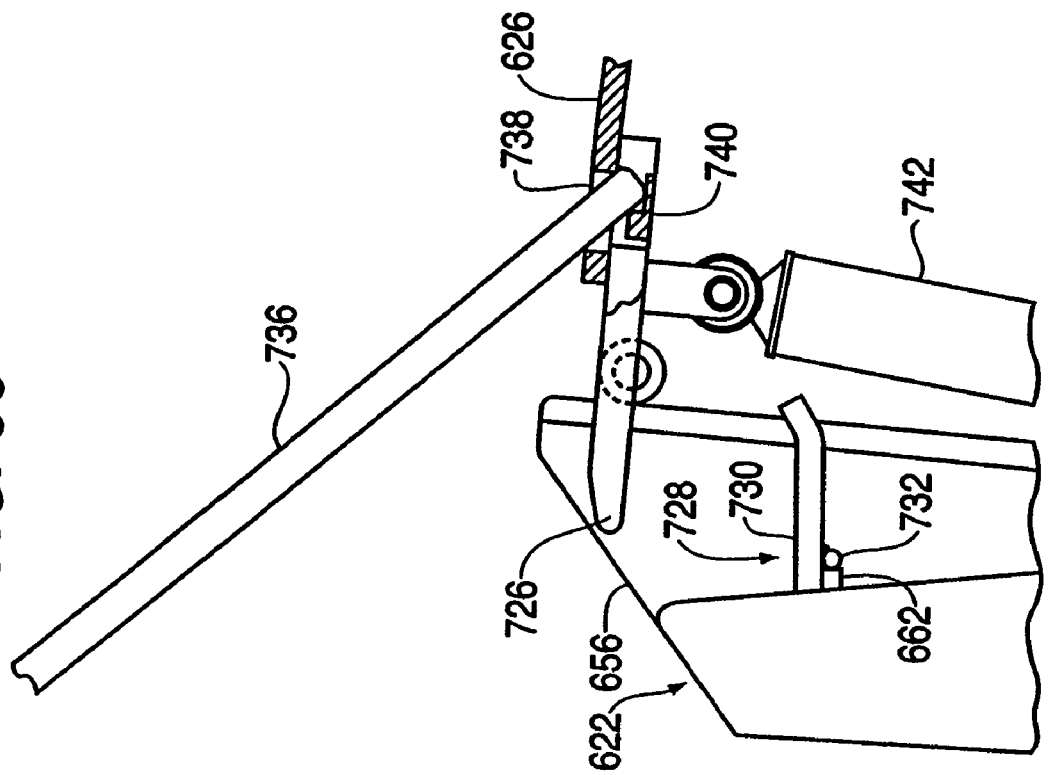
FIG. 38 an enlarged partial view of the lip illustrating the lip control handle engaging the lip in a position to rotate the lip to an extended position.
Figure 37:
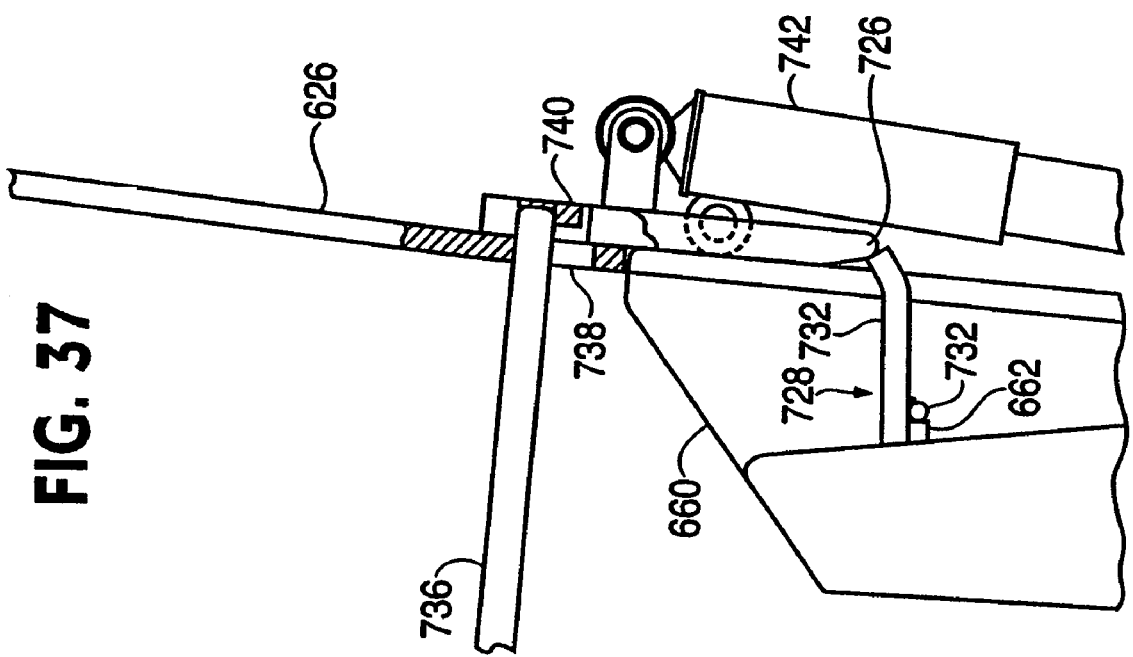
FIG. 37 is an enlarged partial view of the lip illustrating the lip control handle engaging the lip in a position to disengage the lip latch.

FIG. 33 and FIG. 34 illustrate a lip control bar 736 engaging the lip 626. Preferably, the control bar 712 (also referred to as an actuator) can be removed from the lever assembly 694 and be used as control bar (also referred to as an actuator) 736 to rotate the lip 626. As illustrated in FIG. 37 and FIG. 38 the lip 626 has an elongated hole 738 and an angle 740 mounted below the bottom surface of the lip 626 which act as a control bar receiver (also referred to as an actuator receiver). Other embodiments of the invention may include other types of control bar features such as tabs attached to the lip 626 or other suitable control bar receiving arrangements. From the position of the control bar 736 shown in FIG. 37, clockwise movement of the control bar 736 will cause rotation of the lip 626 to the retracted position (when the lip 626 is in a position about perpendicular to the deck assembly 622, this position may also be referred to as a pendant position). To extend a retracted lip 626, the control bar 736 is again used.

FIG. 38 illustrates the control bar 736 engaging the lip 626 so that it can be rotated counterclockwise toward the extended position.

The reason for the elongated hole 738 is twofold as illustrated in FIG. 33 and FIG. 34. In FIG. 33 the control bar 736 is in a position that will easily allow the operator to lift up on the control bar 736 to rotate the lip 626 and force the latch bar 726 (See FIGS. 35 and 36) out of engagement with the lip latch assembly 728. When the latch bar 726 has disengaged from the lip latch 730, the lip 626 will fall by gravity to the retracted position in FIG. 34. If the hole 738 were not elongated then the control bar 736 would rotate to the position marked "E" and would pull the operator forward toward the deck assembly 622. The elongated hole 738 allows the lip 626 to retract yet allow the control bar 736 to stop in the position marked "D" so that the operator is not required to reach so far forward. Similarly when the operator wishes to rotate the lip 626 counterclockwise from the retracted position shown in FIG. 34 to the extended position shown in FIG. 33, the control bar 736 provides the operator with more mechanical advantage in position "D" than in position "E."

FIGS. 33 through 38 also illustrate a shock absorber 742 attached at one end to a pin 744 on the lip 626 and at the other end to a pin 746 on the deck assembly 622. The shock absorber 742 is configured to have little resistance to extension and high resistance to retraction. Thus the shock absorber 742 prevents the lip 626 from dropping rapidly to the retracted position yet does not impede extension of the lip 626.

Figure 39:
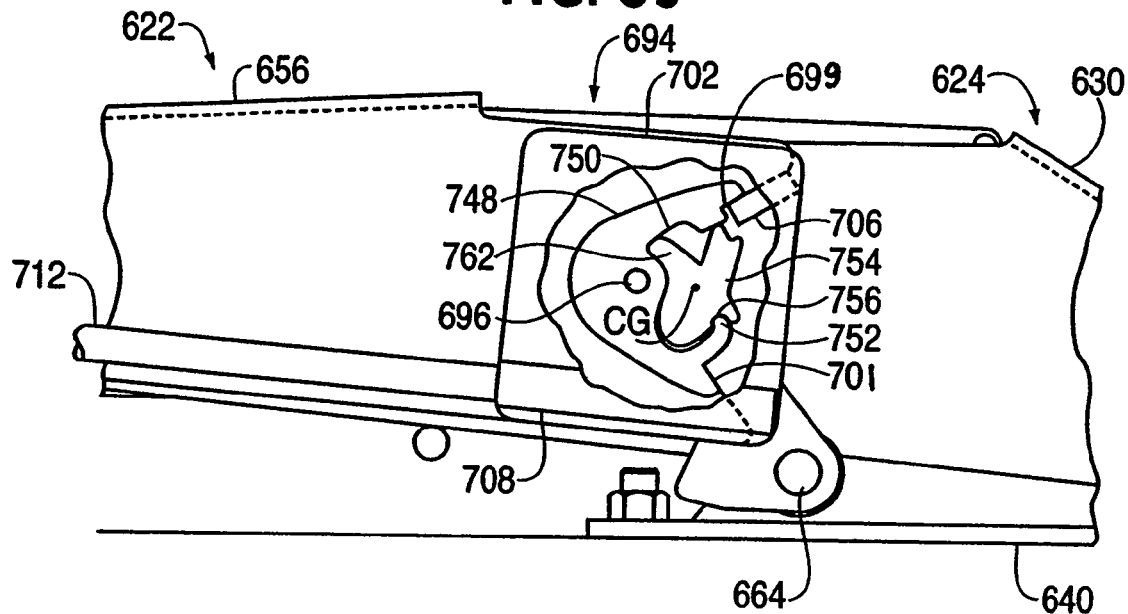
FIG. 39 is an enlarged partial view of the dock leveler in a generally horizontal operative position illustrating the lifting lever in the lowered position and with a second embodiment of a pawl disengaged from the lifting lever.
Figure 40:
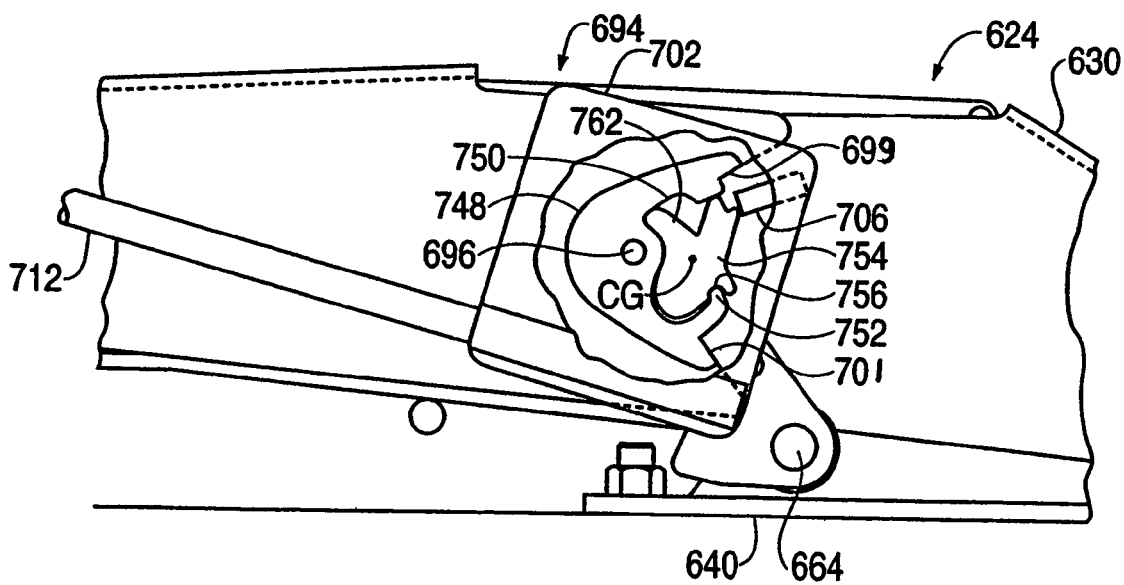
FIG. 40 is an enlarged partial view of the dock leveler in a generally horizontal operative position illustrating the lifting lever in a partially raised position and with a second embodiment of a pawl disengaged from the lifting lever.

FIGS. 39 and 40 illustrates the dock leveler 600 with the deck assembly 622 in a generally horizontal operative position. A latch housing 748 is fixed to the side curb 656 The latch housing 748 has a contoured shape with stop surfaces 699 and 701, a cavity 750 and a pivot boss 752.

Figure 41:
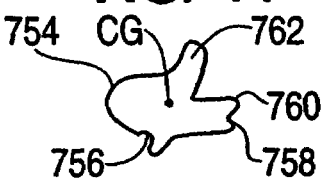
FIG. 41 is view illustrating the second embodiment of the pawl.
Figure 42:
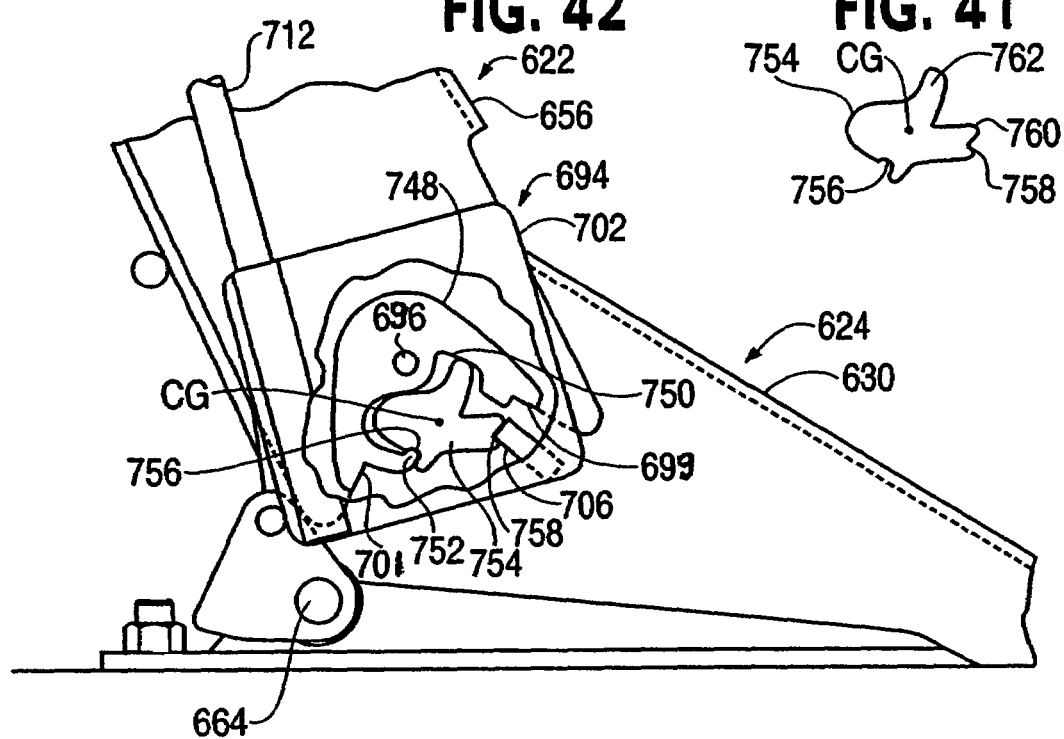
FIG. 42 is an enlarged partial view of the dock leveler in a partially raised position illustrating a first tooth of the pawl engaging the lifting lever.
Figure 43:
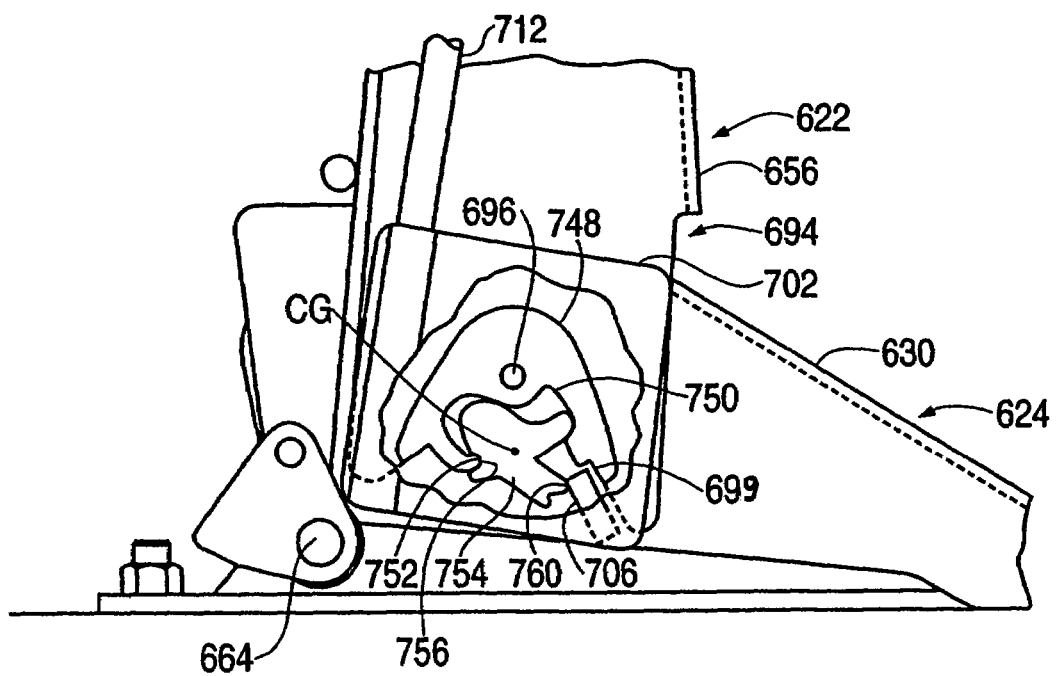
FIG. 43 is an enlarged partial view of the dock leveler in the vertical stored position illustrating a second tooth of the pawl engaging the lifting lever.

FIG. 41 illustrates a pawl 754 having a bearing surface 756, a first tooth 758, a second tooth 760 and a control arm 762. As illustrated in FIGS. 39, 40, 42 and 43, the bearing surface 756 fits over the pivot boss 752 of the latch housing 748. The rotational movement of the pawl 754 is limited by the clearance between the control arm 762 and the internal cavity 750 of the latch housing 748. The pawl 754 is contoured so the center of gravity, marked CG, is forward of the pivot boss 752 when the deck assembly 622 is in a lowered position as illustrated in FIGS. 39 & 40 and is rearward of the pivot boss 752 when the deck assembly 622 is in a raised position as illustrated in FIGS. 42 and 43. Thus when the deck assembly 622 is lowered, the pawl 754 rotates counterclockwise toward the disengaged position. When the deck assembly 622 is raised toward the vertical stored position the pawl 754 rotates clockwise so that the lug 706 on the lever assembly 694 can engage one of the teeth 758 or 760.

As illustrated in FIGS. 39 and 40, the deck assembly 622 is in a generally horizontal operative position. In FIG. 39 the lever assembly 694 is lowered to a position where the lug 706 engages the stop surface 699. The pawl 754 is rotated counterclockwise so that the teeth 758 and 760 are retracted into the cavity 750 and do not engage the lug 706 of the lever assembly 694.

In FIG. 40 the lever assembly 694 is partially raised, illustrating that the lever assembly 694 is free to rotate without the lug 706 engaging the pawl 754. Thus the lever assembly 694 is free to rotate clockwise so the lug 706 can engage the pin 684 on the hold down assembly 680 as illustrated in FIG. 28.

As illustrated in FIG. 42 the deck assembly 622 is partially raised with the lever assembly 694 rotated forward from the initial lifting position. The center of gravity, GC is now rearward of the pivot boss 752 and the pawl 754 has rotated clockwise so that the lug 706 on the lever assembly 694 engages the first tooth 758. Thus the lever assembly 694 can engage the deck assembly 622 at a more convenient position as illustrated in FIG. 42.

FIG. 43 illustrates the deck assembly 622 in the vertical stored position with the lever assembly 694 rotated forward. The pawl 754 has rotated farther clockwise so that the lug 706 on the lever assembly 694 engages the second tooth 760 to hold the lever assembly 694 in the stored position.

Figure 44:
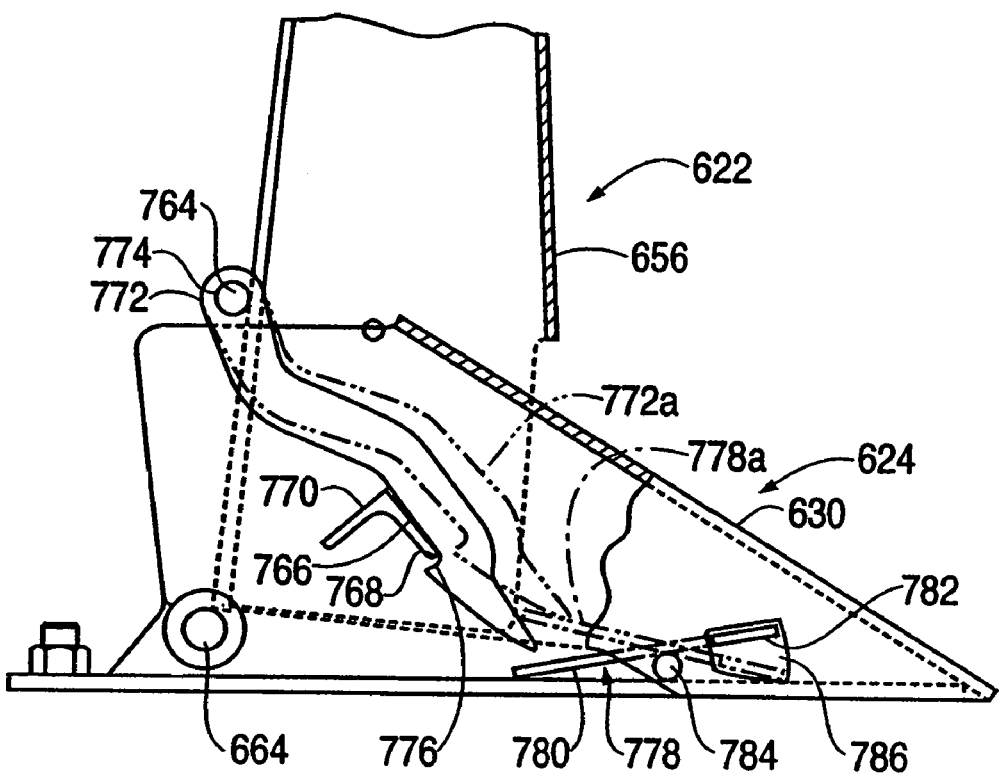
FIG. 44 is an enlarged partial view of the dock leveler in the vertical stored position illustrating a storage latch and release pedal.

According to some embodiments of the invention, a storage latch and release mechanism is provided. FIG. 44 is a partial cut-away view illustrating the deck assembly 622 in the vertical stored position. A pivot shaft 764 is attached to the deck assembly 622. A latch angle (also referred to as a latch lug) 766 is attached to the inner side of the side housing 630 of the base assembly 624 and has a latch surface 768 and a deck surface 770. A latch hook 772 has a pivot hole 774 and a latch surface 776. The latch hook 772 is mounted to rotate on the pivot shaft 764. When the deck assembly 622 is fully raised the latch surface 776 of the latch hook 772 is positioned to engage the latch surface 768 of the latch angle 766 and prevent the deck assembly 622 from lowering as shown with the latch hook 772 in solid lines in FIG. 44.

Figure 45:
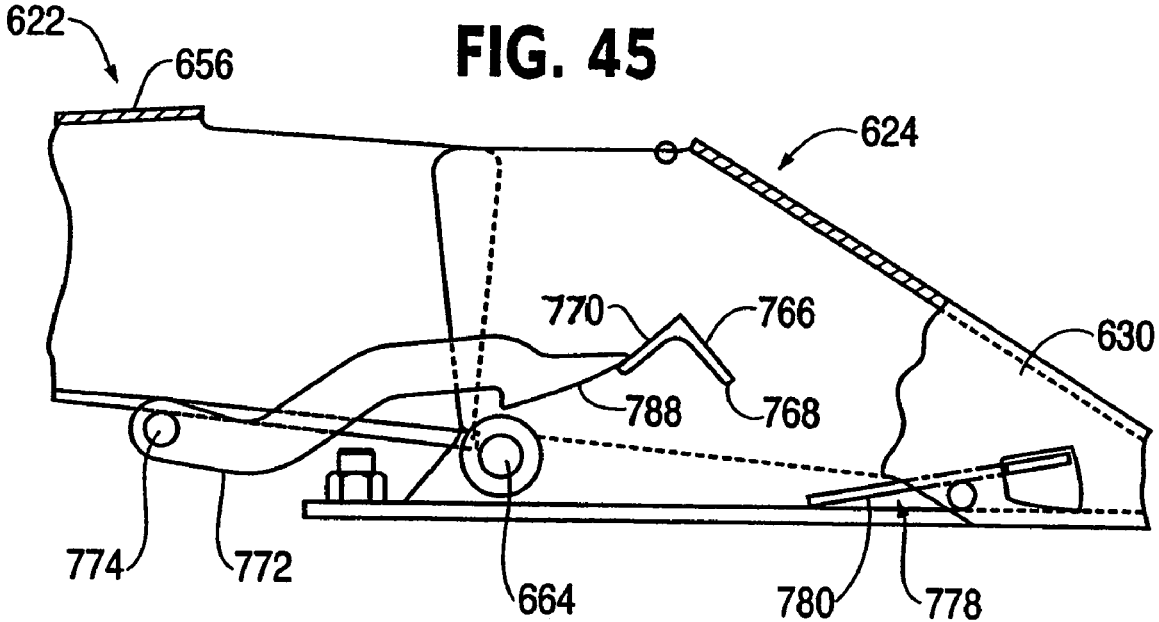
FIG. 45 is an enlarged partial view of the dock leveler in a generally horizontal operative position illustrating the storage latch released.

To lower the deck assembly 622 from the raised, stored position, a release leveler assembly 778 is provided. The release lever assembly 778 has a lever arm 780 and a foot pedal 782. The release lever assembly 778 is mounted inside the side housing 630 on the pivot shaft 784. The foot pedal 782 protrudes through an opening 786 in the side of the side housing 630. To release the latch hook 772, the operator steps on the foot pedal 782 and causes the release lever assembly 778 to rotate to the position illustrated by the broken lines 778a and lift the end of the latch hook 772 to the position illustrated by the broken lines 772a. Thus the operator is able to disengage the latch hook 772 from the latch angle 766 and allow the deck assembly 622 to lower to the position shown in FIG. 45.

The latch hook 772 has a cam surface 788 that is engaged with the ramp surface 770 of the latch angle 766 when the deck assembly 622 is in the lowered position. (See FIG. 45). When the deck assembly 622 is raised, the cam surface 788 of the latch hook 772 will slide up the ramp surface 770 of the latch angle 766 and achieve the latching position shown in FIG. 44.

While the embodiments shown in the accompanying FIGS. show a dock leveler to have relatively flat surfaces as the ramp deck, and lip, some embodiments of the invention may include curved surfaces. For example, in some embodiments of the invention, the deck comprises two or more substantially flat plates connected at an angle. This aids the dock leveler to achieve positions where the end of the deck is in a position below the top surface of the loading dock. Other embodiments of the invention, may include a deck being contoured in order to achieve positions where the end of the deck is in a below dock level position. For example, the deck may have a curved surface that will permit the end of the deck to achieve a blow dock level position. The illustrated FIGS. are meant to be exemplary. The invention is not limited to the embodiments shown and described herein.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents maybe resorted to, falling within the scope of the invention.

What is claimed is:

1. A vertically storing dock leveler comprising:
   a support structure mountable to a loading dock;
   a deck assembly pivotally mounted to the support structure and configured to move between a substantially vertical position and a working position;
   a counterbalance assembly comprising a spring connected to the support structure and the deck assembly, the spring having a moveable effective anchor point at one end wherein a line of action of the spring moves as the effective anchor point moves; and
   a hold down mechanism configured to selectively cause the deck assembly to remain downwardly biased when it is raised above a working range or cause the ramp assembly to become upwardly biased to the substantially vertical position;
   a lifting mechanism configured to permit an operator to actuate the lifting mechanism and raise the deck assembly from a working range to a stored position, wherein the lifting mechanism comprises:
   a lever assembly pivotally mounted to the deck assembly via a pivot pin;
   an actuator located on the lever assembly wherein the actuator when actuated by an operator causes the plate to rotate about the pivot pin; and
   a lug mounted on the lever assembly and configured to urge against an urging pin mounted on the hold down assembly when the actuator is actuated and as the lug urges against the urging pin, a force will act on the pivot pin to raise the deck assembly.

2. The dock leveler of claim 1, wherein, when the deck assembly is in the working position, the lifting mechanism is configured to pivot to a stored position where the actuator is substantially parallel to the surface of the loading dock.

3. The dock leveler of claim 2, further comprising a foot peg mounted on the lever assembly and configured to permit the lifting mechanism to be raised from the stored position to a working position by an operator applying pressure to the foot peg.

4. The dock leveler of claim 1, wherein at least part of the actuator is removable from the lever assembly.

5. The dock leveler of claim 4, wherein the actuator comprises:
   a lever; and
   a receiver mounted on the lever assembly wherein the lever removably connects to the receiver and when connected in the receiver, actuation of the lever pivots the lever assembly.

6. The dock leveler of claim 5, further comprising a lip pivotally connected to an end of the deck assembly and a lever receiver associated with the lip and configured to permit the lever to move the lip between extended and pendant positions.

7. The dock leveler of claim 1, further configured to provide a mechanical advantage in raising the deck assembly from the working range by reducing the force required by the operator to lift the deck assembly by locating the pivot pin of the lever assembly a shorter distance away from the urging pin than a distance from the pivot pin of the lever assembly to the pivotal connection between the deck assembly and the support structure.

* * * * *